United States Patent
Mitsumoto et al.

(10) Patent No.: US 9,391,313 B2
(45) Date of Patent: Jul. 12, 2016

(54) LITHIUM METAL COMPOSITE OXIDE POWDER

(71) Applicant: Mitsui Mining & Smelting Co., Ltd., Tokyo (JP)

(72) Inventors: Tetsuya Mitsumoto, Takehara (JP); Hitohiko Ide, Takehara (JP); Shinya Kagei, Takehara (JP); Yoshimi Hata, Takehara (JP)

(73) Assignee: Mitsui Mining & Smelting Co., Ltd., Tokyo (JP)

(*) Notice: Subject to any disclaimer, the term of this patent is extended or adjusted under 35 U.S.C. 154(b) by 0 days.

(21) Appl. No.: 14/772,505

(22) PCT Filed: Mar. 4, 2014

(86) PCT No.: PCT/JP2014/055435
§ 371 (c)(1),
(2) Date: Sep. 3, 2015

(87) PCT Pub. No.: WO2014/136760
PCT Pub. Date: Sep. 12, 2014

(65) Prior Publication Data
US 2016/0013472 A1  Jan. 14, 2016

(30) Foreign Application Priority Data

Mar. 4, 2013 (JP) .................................. 2013-042282
Apr. 26, 2013 (JP) .................................. 2013-093816

(51) Int. Cl.
*H01M 4/131* (2010.01)
*H01M 4/485* (2010.01)
*H01M 4/505* (2010.01)
(Continued)

(52) U.S. Cl.
CPC ............... *H01M 4/131* (2013.01); *C01G 53/50* (2013.01); *H01M 4/485* (2013.01); *H01M 4/505* (2013.01); *H01M 4/525* (2013.01); *C01P 2002/74* (2013.01); *C01P 2004/61* (2013.01); *C01P 2006/12* (2013.01); *C01P 2006/80* (2013.01);
(Continued)

(58) Field of Classification Search
CPC ..... H01M 4/131; H01M 4/485; H01M 4/525; H01M 4/366; H01M 4/505
See application file for complete search history.

(56) References Cited

U.S. PATENT DOCUMENTS

2010/0117025 A1    5/2010  Takeuchi et al.
2012/0164530 A1*   6/2012  Temmyo ............... H01M 4/133
                                                          429/211

(Continued)

FOREIGN PATENT DOCUMENTS

JP          8171910 A    7/1996
JP       2002222648 A    8/2002
(Continued)

*Primary Examiner* — Stewart Fraser
(74) *Attorney, Agent, or Firm* — The Webb Law Firm

(57) ABSTRACT

Provided is a lithium metal composite oxide (powder) having a layered structure, which is capable of exhibiting excellent characteristics in both charge-discharge cycle ability and initial charging and discharging efficiency, and is capable of effectively reducing initial resistance, when being used in a positive electrode of a lithium battery. The lithium metal composite oxide (powder) comprises an amount of S which is less than 0.10% by mass of the lithium metal composite oxide powder, a ratio of a crystallite size of a (003) plane to a crystallite size of a (110) plane which is equal to or greater than 1.0 and less than 2.5, and a ratio of a primary particle area to a secondary particle area of 0.004 to 0.035.

15 Claims, 1 Drawing Sheet

(51) Int. Cl.
*H01M 4/525* (2010.01)
*C01G 53/00* (2006.01)

(52) U.S. Cl.
CPC .......... *H01M 2220/20* (2013.01); *Y02E 60/122* (2013.01); *Y02P 70/54* (2015.11)

(56) References Cited

U.S. PATENT DOCUMENTS

| | | | |
|---|---|---|---|
| 2012/0282525 A1 | 11/2012 | Nagai et al. | |
| 2013/0011331 A1 | 1/2013 | Nagai et al. | |
| 2013/0029216 A1 | 1/2013 | Kim et al. | |
| 2013/0115508 A1* | 5/2013 | Hoshina | C01G 23/005 429/163 |

FOREIGN PATENT DOCUMENTS

| | | | |
|---|---|---|---|
| JP | 200317052 | A | 1/2003 |
| JP | 200334536 | A | 2/2003 |
| JP | 2004253169 | A | 9/2004 |
| JP | 2004355824 | A | 12/2004 |
| JP | 200529424 | A | 2/2005 |
| JP | 2007214118 | A | 8/2007 |
| JP | 2007257985 | A | 10/2007 |
| JP | 4213768 | B2 | 1/2009 |
| JP | 201064907 | A | 3/2010 |
| JP | 2011119092 | A | 6/2011 |
| JP | 2011228292 | A | 11/2011 |
| JP | 2011238416 | A | 11/2011 |
| JP | 2012221855 | A | 11/2012 |
| WO | 2008091028 | A1 | 7/2008 |
| WO | 2013161619 | A1 | 10/2013 |

* cited by examiner

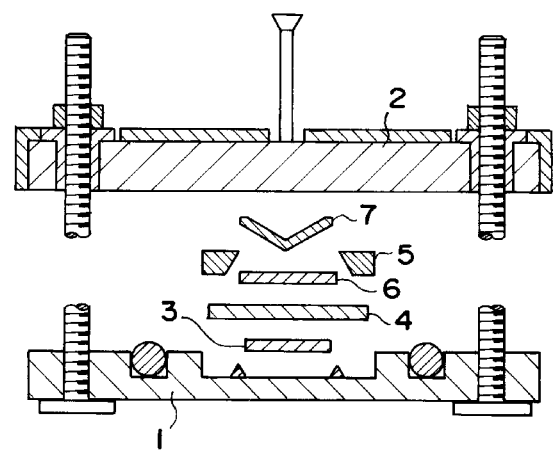

LITHIUM METAL COMPOSITE OXIDE POWDER

CROSS-REFERENCE TO RELATED APPLICATIONS

This application is the United States national phase of International Application No. PCT/JP2014/055435 filed Mar. 4, 2014, and claims priority to Japanese Patent Application Nos. 2013-042282 and 2013-093816, filed Mar. 4, 2013 and Apr. 26, 2013, respectively, the disclosures of which are hereby incorporated in their entirety by reference.

TECHNICAL FIELD

The present invention relates to a lithium metal composite oxide powder that can be used as a positive electrode active material of a lithium battery, and particularly, to a lithium metal composite oxide powder which contains a lithium metal composite oxide having a layered structure, and is capable of exhibiting excellent performance as a positive electrode active material of a battery that is mounted on an electric vehicle (EV) or a hybrid electric vehicle (HEV).

BACKGROUND ART

Lithium batteries, and lithium secondary batteries among the lithium batteries have characteristics such as a high energy density and a long lifespan, and have been used as a power supply of electric home appliances such as a video camera, portable electronic apparatuses such as a note book computer and a cellular phone, and the like. Recently, the lithium secondary batteries have been applied to a large-sized battery that is mounted on the electric vehicle (EV), the hybrid electric vehicle (HEV), and the like.

The lithium secondary batteries have the following structure. During charging, lithium is eluted from a positive electrode as an ion, moves to a negative electrode, and is intercalated to the negative electrode. In contrast, during discharging, the lithium ion returns to the positive electrode from the negative electrode. It is known that a high energy density of the lithium secondary battery is caused by a potential of a positive electrode material.

As a positive electrode active material of the lithium secondary batteries, in addition to a lithium-manganese oxide ($LiMn_2O_4$) having a spinel structure, a lithium metal composite oxide such as $LiCoO_2$, $LiNiO_2$, and $LiMnO_2$ which have a layered structure are known. For example, $LiCoO_2$ has a layered structure in which a lithium atom layer and a cobalt atom layer are alternately laminated through an oxygen atom layer, and thus $LiCoO_2$ has large charge and discharge capacity and is excellent in diffusibility in intercalation and deintercalation of lithium ions. Accordingly, the majority of the lithium secondary batteries which are commercially available are lithium metal composite oxides such as $LiCoO_2$ having a layered structure.

The lithium metal composite oxides such as $LiCoCO_2$ and $LiNiO_2$ which have a layered structure are expressed by General Formula $LiMeO_2$ (Me: transition metal). A crystal structure of the lithium metal composite oxides having the layered structure belongs to a space group R-3m ("-" is typically attached to an upper section of "3" and represents rotary inversion. The same shall apply hereinafter), and a Li ion, a Me ion, and an oxide ion occupy a 3a site, a 3b site, and a 6c site, respectively. In addition, it is known that the structure shows a layered structure in which a layer (Li layer) constituted by the Li ion, and a layer (Me layer) constituted by the Me ion are alternately laminated through an O layer constituted by the oxide ion.

In the related art, with regard to the lithium metal composite oxides ($LiM_xO_2$) having a layered structure, for example, Patent Document 1 discloses an active material that is expressed by Formula: $LiN_xMn_{1-x}O_2$ (in Formula, $0.7 \leq x \leq 0.95$). The active material is obtained as follows. An alkali solution is added to a mixed aqueous solution of manganese and nickel so as to allow manganese and nickel to coprecipitate, lithium hydroxide is added to the resultant mixture, and then calcining is performed.

Patent Document 2 discloses a positive electrode active material which is constituted by crystal grains of oxides including three kinds of transition metals and is expressed by $Li[Li_x(A_PB_QC_R)_{1-x}]O_2$ (in Formula, A, B, and C represent three different kinds of transition metal elements, $-0.1 \leq x \leq 0.3$, $0.2 \leq P \leq 0.4$, $0.2 \leq Q \leq 0.4$, and $0.2 \leq R \leq 0.4$), and in which a crystal structure of the crystal grains is a layered structure and arrangement of oxygen atoms that constitute the oxides is cubic closest packing.

Patent Document 3 discloses a method of producing a layered lithium-nickel-manganese composite oxide powder so as to provide the layered lithium-nickel-manganese composite oxide powder having a high volume density. The method includes a step of drying slurry through spray dry, the slurry containing at least a lithium source compound, a nickel source compound, and a manganese source compound, which are pulverized and mixed-in, in a molar ratio [Ni/Mn] of a nickel atom [Ni] and a manganese atom [Mn] which is set to a range of 0.7 to 0.9, a step of calcining the resultant dried object to obtain a layered lithium-nickel-manganese composite oxide powder, and a step of pulverizing the composite oxide powder.

Patent Document 4 discloses a material which contains a lithium transition metal composite oxide which has a crystallite diameter enlarged through mixing-in of vanadium (V) and/or boron (B), that is, a lithium transition metal composite oxide expressed by General Formula $Li_xM_yO_{z-\delta}$ (In Formula, M represents Co or Ni which is a transition metal element, and relationships of (X/Y)=0.98 to 1.02, and ($\delta$/Z) 0.03 are satisfied), and contains vanadium (V) and/or boron (B) in a ratio of ((V+B)/M)=0.001 to 0.05 (molar ratio) with respect to the transition metal element (M) that constitutes the lithium transition metal composite oxide, and in which a primary particle size is equal to or greater than 1 μm, the crystallite diameter is equal to or greater than 450 Å, and lattice distortion is 0.05% or less.

Patent Document 5 is aimed at providing a positive electrode active material for a nonaqueous secondary battery which is constituted by primary particles capable of maintaining a high volume density or high battery characteristics without anxiety for occurrence of cracking. Patent Document 5 suggests a positive electrode active material for a nonaqueous secondary battery which is a lithium composite oxide in a powder form of monodispersed primary particles containing one kind of element selected from the group consisting of Co, Ni, and Mn, and lithium as a main component, and in which D50 is 3 μm to 12 μm, a specific surface area is 0.2 $m^2$/g to 1.0 $m^2$/g, a volume density is equal to or greater than 2.1 g/$cm^3$, and an inflection point of a volume reduction rate in accordance with a Cooper plot method does not appear at 3 ton/$cm^2$ or less.

Patent Document 6 relates to a lithium metal composite oxide powder that is expressed by $Li_zNi_{1-w}M_wO_2$ (provided that, M represents at least one kind of metal element selected from the group consisting of Co, Al, Mg, Mn, Ti, Fe, Cu, Zn, and Ga, and relationships of $0<w\leq0.25$ and $1.0\leq z\leq1.1$ are satisfied), and suggests a positive electrode active material for a nonaqueous electrolyte secondary battery which includes primary particles of the lithium metal composite oxide powder, and secondary particles formed through agglomeration of a plurality of the primary particles, and in which the shape of the secondary particles is a spherical shape or an elliptical spherical shape, equal to or greater than 95% of the secondary particles has a particle size of equal to or less than 20 μm, an average particle size of the secondary particles is 7 μm to 13 μm, a tap density of the powder is equal to or greater than 2.2 g/cm$^3$, an average volume of pores, which have an average diameter of 40 nm or less in pore size distribution measurement in accordance with a nitrogen absorption method, is 0.001 cm$^3$/g to 0.008 cm$^3$/g, and average crushing strength of the secondary particles is 15 MPa to 100 MPa.

Patent Document 7 suggests a lithium metal composite oxide having a layered structure. In the lithium metal composite oxide, a ratio of a crystallite diameter to an average powder particle size (D50), which is obtained through a laser diffraction and scattering particle size distribution measurement method after performing pulverization with a wet pulverizer and the like until D50 becomes 2 μm or less, granulation and drying with a thermal spray dryer, and calcining, is 0.05 to 0.20.

CITATION LIST

Patent Document

Patent Document 1: JP H8-171910 A
Patent Document 2: JP 2003-17052 A
Patent Document 3: JP 2003-34536 A
Patent Document 4: JP 2004-253169 A
Patent Document 5: JP 2004-355824 A
Patent Document 6: JP 2007-257985 A
Patent Document 7: Japanese Patent No. 4213768 (WO 2008/091028)

DISCLOSURE OF THE INVENTION

Problem to be Solved by the Invention

With regard to the lithium metal composite oxide having a layered structure, it has been difficult to develop a lithium metal composite oxide powder exhibiting excellent characteristics in both charge-discharge cycle ability and initial charging and discharging efficiency.

In addition, in the case of using the lithium metal composite oxide having a layered structure as a positive electrode active material of a lithium secondary battery, particularly, as a positive electrode active material of an in-vehicle lithium secondary battery, it is necessary to reduce initial resistance.

The invention relates to a lithium metal composite oxide (powder) having a layered structure, and an object thereof is to suggest a new lithium metal composite oxide powder which is capable of exhibiting excellent characteristics in both charge-discharge cycle ability and initial charging and discharging efficiency when being used in a positive electrode of a lithium battery, and is capable of effectively reducing initial resistance.

SUMMARY OF THE INVENTION

According to an aspect of the invention, there is provided a lithium metal composite oxide powder that contains a lithium metal composite oxide powder having a layered structure.

An amount of S, which is obtained through measurement by an ICP emission analyzer, is less than 0.10% by mass of the lithium metal composite oxide powder (100% by mass).

A ratio of a crystallite size of a (003) plane to a crystallite size of a (110) plane in the lithium metal composite oxide, which are calculated from Sherrer's formula by using an X-ray diffraction pattern obtained through X-ray diffraction with CuKα-rays, is equal to or greater than 1.0 and less than 2.5.

A ratio (referred to as "primary particle area/secondary particle area") of a primary particle area that is obtained by a method of measuring the primary particle area to a secondary particle area that is obtained by a method of measuring the secondary particle area from secondary particles with a size corresponding to D50 in accordance with a volume-based particle size distribution obtained through measurement by a laser diffraction and scattering particle size distribution measurement method (hereinafter, referred to as "D50") is 0.004 to 0.035.

(Method of Measuring Secondary Particle Area)

In the method of measuring the secondary particle area, the lithium metal composite oxide powder is observed with an electron microscope, five secondary particles with a size corresponding to D50 are randomly selected, and the area is calculated by setting a particle length as a diameter (μm) in a case where the secondary particles have a spherical shape, or through approximation to a spherical shape in a case where the secondary particles have an indefinite shape, and an average value of five areas is obtained as the secondary particle area (μm$^2$).

(Method of Measuring Primary Particle Area)

In the method of measuring the primary particle area, the lithium metal composite oxide powder is observed with the electron microscope, five secondary particles per one viewing field are randomly selected, 10 primary particles are randomly selected from each of the selected five secondary particles, the area is calculated by setting the longest inter-grain-boundary distance as a major axis (μm) and by setting the shortest inter-grain-boundary distance as a minor axis (μm) in a case where the primary particles have a rod shape, or by setting a length of an inter-grain-boundary distance as a diameter (μm) in a case where the primary particles have a spherical shape, and an average value of 50 areas is obtained as the primary particle area (μm$^2$).

When using the lithium metal composite oxide powder suggested by the invention as a positive electrode material of a lithium battery, it is possible to exhibit excellent characteristics in both charge-discharge cycle ability and initial charging and discharging efficiency, and it is possible to effectively reduce initial resistance. Accordingly, the lithium metal composite oxide suggested by the invention is particularly excellent as a positive electrode active material of an in-vehicle battery, and particularly, a battery that is mounted on an electric vehicle (EV) or a hybrid electric vehicle (HEV).

BRIEF DESCRIPTION OF THE DRAWING

The drawing FIGURE is a cross-sectional view illustrating a configuration of an electrochemical evaluation cell that is prepared during the battery characteristic evaluation in the Examples.

DETAILED DESCRIPTION OF THE INVENTION

Hereinafter, an embodiment of the invention will be described. However, the invention is not limited to the following embodiment.

<Present Lithium Metal Composite Oxide Powder>

A lithium metal composite oxide powder (hereinafter, referred to as "present lithium metal composite oxide powder") of the present embodiment is a powder that contains lithium metal composite oxide particles which have a layered structure as a main component.

Here, the "lithium metal composite oxide having a layered structure" represents a lithium metal composite oxide having a layered structure in which a lithium atom layer and a metal atom layer are alternately laminated through an oxygen atom layer.

In addition, the "main component" is intended to include a meaning in that other components are allowed to be contained in a range not obstructing a function of the main component unless otherwise stated. A ratio of the main component that is contained is at least equal to or greater than 50% by mass of the present lithium metal composite oxide, particularly equal to or greater than 70% by mass, still more particularly equal to or greater than 90% by mass, and still more particularly equal to or greater than 95% (including 100%) by mass.

(Present Lithium Metal Composite Oxide)

A lithium metal composite oxide (hereinafter, referred to as "present lithium metal composite oxide") that constitutes the main component of the present lithium metal composite oxide powder is a lithium metal composite oxide which has a layered structure and is expressed by General Formula (1): $Li_{1-x}M_{1-x}O_2$.

In Formula (1), "1+x" is preferably 1.00 to 1.15, more preferably equal to or greater than 1.01 or equal to or less than 1.10, and still more preferably equal to or greater than 1.02 or equal to or less than 1.07.

In Formula (1), "M" may be three elements including Mn, Co, and Ni, or four or more elements including the three elements, and at least one kind among transition elements from elements of Group 3 to elements of Group 11 in the periodic table, and typical elements up to a third cycle in the periodic table.

Here, examples of the transition elements from Group 3 elements to Group 11 elements in the periodic table, or the typical elements up to the third cycle in the periodic table include Al, V, Fe, Ti, Mg, Cr, Ga, In, Cu, Zn, Nb, Zr, Mo, W, Ta, Re, and the like.

Accordingly, for example, "M" may be any one or more kind among Mn, Co, Ni, Al, V, Fe, Ti, Mg, Cr, Ga, In, Cu, Zn, Nb, Zr, Mo, W, Ta, and Re, may be constituted by only three elements of Mn, Co, and Ni, may include one or more kinds of other elements in addition to the three elements, or may have other configurations. Examples of this configuration includes the case of including Mn, Co, Ni, and Al, the case of including Mn, Co, Ni, Al, and Mg, and the like.

On the other hand, "1-x" in Formula (1) represents a compositional ratio with "2" set as a reference, and represents the sum of composition ratios of elements which constitute M. Here, "2" is a total composition ratio of Li and M. For example, in a case where the M element is constituted by two kinds of elements, "1-x" represents the sum of composition ratios of the two kinds of elements.

In a case where "M" in Formula (1) includes three elements of Mn, Co, and Ni, it is preferable that a molar ratio of Mn, Co, and Ni which are included be Mn:Co:Ni=0.10 to 0.45:0.03 to 0.40:0.30 to 0.75, and more preferably Mn:Co:Ni=0.10 to 0.40:0.03 to 0.40:0.30 to 0.75.

For example, in the case of being expressed by General Formula (2): $Li_{1-x}(Mn_\alpha Co_\beta Ni_\gamma)_{1-x}O_2$, the following ratio is preferable.

In Formula (2), a value of α is preferably 0.10 to 0.45, more preferably equal to or greater than 0.15 or equal to or less than 0.40, and still more preferably equal to or greater than 0.20 or equal to or less than 0.35.

A value of β is preferably 0.03 to 0.40, more preferably equal to or greater than 0.04 or equal to or less than 0.30, and still more preferably equal to or greater than 0.05 or equal to or less than 0.25.

A value of γ is preferably 0.30 to 0.75, more preferably equal to or greater than 0.40 or equal to or less than 0.65, and still more preferably equal to or greater than 0.45 or 0.55.

On the other hand, in General Formulae (1) and (2), an atomic ratio corresponding to an amount of oxygen is described as "2" for convenience, but may have some non-stoichiometry.

(Integrated Intensity Ratio of (003) Plane Peak/(104) Plane Peak)

With regard to the present lithium metal composite oxide, it is preferable that in an X-ray diffraction pattern obtained by X-ray diffraction with CuKα-rays, a ratio (003)/(104) of integrated intensity of a peak derived from a (003) plane to integrated intensity of a peak derived from a (104) plane be greater than 1.15.

In a case where the ratio (003)/(104) of the integrated intensity of the (003) plane to the integrated intensity of the (104) plane is greater than 1.15, this case represents that an amount of a portion taking a rock-salt structure is small in a crystal structure that constitutes the present lithium metal composite oxide powder.

When examining particles of the lithium metal composite oxide having a layer structure, it can be seen that if a rock-salt structure layer is formed on a particle surface, the rock-salt structure layer serves as a resistive component, and thus initial resistance increases. Here, in a case where the formation of the rock-salt structure layer is suppressed by the following production method, and the ratio (003)/(104) of the integrated intensity of the (003) plane to the integrated intensity of the (104) plane is set to greater than 1.15, it can be seen that it is possible to effectively reduce the initial resistance.

From this viewpoint, with regard to the present lithium metal composite oxide powder, it is preferable that the ratio (003)/(104) of the integrated intensity of the (003) plane to the integrated intensity of the (104) plane be greater than 1.15, more preferably equal to or greater than 1.17 or equal to or less than 1.55, still more preferably equal to or greater than 1.20 or equal to or less than 1.45, and still more preferably equal to or greater than 1.24 or equal to or less than 1.35.

When it is desirable to set the ratio (003)/(104) of the integrated intensity of the (003) plane to the integrated intensity of the (104) plane to greater than 1.15, as described later, it is preferable that temporary calcining be performed at a temperature equal to or higher than 650° C. and lower than 730° C., washing is performed with water, and then main calcining is performed at a temperature of 830° C. to 950° C. Alternatively, it is preferable that at least prior to wet pulverization, raw materials other than a Li compound be subjected to a treatment including any one kind of calcining, washing with water, and magnetic separation, or a combination of two or more kinds thereof so as to set an amount of S in a Ni raw material to less than 0.17%, an amount of S in a Mn raw material to less than 0.24%, and an amount of S in a Co raw material to less than 0.12%, and so as to adjust an amount of magnetic substance in all of the raw materials other than the Li compound to less than 750 ppb, the temporary calcining is performed at a temperature equal to or higher than 650° C.

and lower than 730, and the main calcining is performed at 830° C. to 950° C. However, there is no limitation to the method as described above.

(Crystallite Size Ratio of (003) Plane/(100) Plane)

In an X-ray diffraction pattern obtained through X-ray diffraction with CuKα-rays, the present lithium metal composite oxide has a characteristic in that a ratio (003)/(110) of a crystallite size of a (003) plane to a crystallite size of a (110) plane is equal to or greater than 1.0 and less than 2.5.

As the ratio of the crystallite size of the (003) plane to the crystallite size of the (110) plane is close to 1.0, it is assumed that expansion and contraction during intercalation and deintercalation of Li occur in an isotropic manner. In a case where the ratio of the crystallite size of the (003) plane to the crystallite size of the (110) plane is equal to or greater than 2.5, anisotropy of expansion and contraction increases, and thus a capacity retention rate after cycles may decrease. On the other hand, as the ratio of the crystallite size of the (003) plane to the crystallite size of the (110) plane is close to 1.0, it approaches a rock-salt structure from a layered structure, and thus an amount of Li can be deintercalated during charging decreases, and thus charge capacity may decrease.

From this viewpoint, it is preferable that the ratio (003)/(110) of the crystallite size of the (003) plane to the crystallite size of the (110) plane be equal to or greater than 1.0 and less than 2.5, more preferably greater than 1.3 and less than 2.5, and still more preferably equal to or greater than 1.5 or equal to or less than 2.4.

(D50)

In the present lithium metal composite oxide powder, it is preferable that D50 in accordance with a volume-based particle size distribution obtained through measurement by a laser diffraction and scattering particle size distribution measurement method be less than 20 μm. When D50 is less than 20 μm, it is possible to prevent particles from being non-uniform due to settling down during storage of the slurry. In addition, when D50 of the present lithium metal composite oxide becomes greater than 4 μm, it is possible to prevent from the viscosity of the slurry from increasing due to agglomeration of the particles.

From the viewpoints, it is preferable that D50 of the present lithium metal composite oxide be less than 20 μm, more preferably less than 17 μm, still more preferably less than 15 μm, and still more preferably greater than 4 μm and equal to or less than 13 μm.

On the other hand, the laser diffraction and scattering particle size distribution measurement method is a method of measuring calculating a particle size by considering one agglomerated powdered particle as one particle (agglomerated particle). D50 in accordance with the volume-based particle size distribution obtained through measurement by the measurement method represents a 50%-volume accumulated particle size, that is, a diameter on an accumulated 50% side from a fine side of an accumulated percentage notation of a particle size measurement value in terms of a volume in a volume-based particle size distribution chart.

So as to adjust D50 of the present lithium metal composite oxide to the above-described range, it is preferable to adjust D50 of a starting raw material, a calcining temperature, or a calcining time, or to adjust D50 through crushing after calcining. However, there is no limitation to the adjustment method as described above.

(Primary Particle Area/Secondary Particle Area)

In the present lithium metal composite oxide, it is preferable that a ratio (referred to as "primary particle area/secondary particle area") of a primary particle area that is obtained by the following measurement method to a secondary particle area that is obtained by the following measurement method from secondary particles with a size corresponding to D50 in accordance with the volume-based particle size distribution obtained through the measurement by the laser diffraction and scattering particle size distribution measurement method be 0.004 to 0.035.

When the primary particle area/the secondary particle area is 0.035 or less, an area of a secondary particle surface that comes into contact with an electrolytic solution is great, and thus it is possible to smoothly perform intercalation and deintercalation of lithium ions, and it is possible to raise the first cycle efficiency. On the other hand, when the primary particle area/the secondary particle area is equal to or greater than 0.004, it is possible to decrease an interface between the primary particles in the secondary particles, and as a result, it is possible to lower resistance inside the secondary particles, and it is possible to raise the first cycle efficiency. Accordingly, in this range, it is possible to improve initial charging and discharging efficiency. However, in a case where D50 is equal to or less than 4 μm, it is confirmed that this tendency is not exhibited in the same manner.

From the viewpoints, it is preferable that the primary particle area/the secondary particle area be equal to or greater than 0.004 or equal to or less than 0.026 in the above-described range, and more preferably be equal to or greater than 0.006 or equal to or less than 0.017.

With regard to adjustment of the primary particle area/the secondary particle area of the present lithium metal composite oxide to the above-described range, for example, in the following production method in accordance with a spray-dry method, the adjustment may be performed in such a manner that crushing strength during crushing after calcining or a heat treatment is set to be higher in comparison to the related art so as to reduce D50, thereby increasing "primary particle area/secondary particle area".

On the other hand, in the following production method in accordance with a coprecipitation method, in comparison to the related art, for example, the above-described adjustment may be performed in such a manner that the calcining temperature is lowered, a primary particle size of a coprecipitated powder is made to be smaller, or the calcining is performed in a carbon-dioxide-gas-containing atmosphere so as to reduce an average particle size of the primary particles, thereby reducing "primary particle area/secondary particle area".

However, there is no limitation to the adjustment methods described as above.

The "primary particle area" represents a surface area of primary particles on an electron microscope photograph. The primary particle area can be obtained as follows. The lithium metal composite oxide powder is observed with an electron microscope (for example, with a magnification of 1000 times), five secondary particles with a size corresponding to D50 are randomly selected for each viewing field, and 10 primary particles are randomly selected from each of the five secondary particles which are selected while changing the magnification to 5000 times as necessary. In a case where the primary particles have a rod shape, the area is calculated by setting the longest inter-grain-boundary distance as a major axis (μm) and by setting the shortest inter-grain-boundary distance as a minor axis (μm). In addition, in a case where the primary particles have a spherical shape, the area is calculated by setting a length of an inter-grain-boundary distance as a diameter (μm). Then, an average value of 50 areas is obtained as the primary particle area ($\mu m^2$).

At this time, a primary particle image of the electron microscope may be used to calculate the area of the primary particles by using image analysis software.

In addition, the "secondary particle area" represents an area of secondary particles in a plan view on an electron microscope photograph. For example, the secondary particle area can be obtained as follows. The lithium metal composite oxide powder is observed with an electron microscope (for example, at a magnification of 1000 times), and five secondary particles with a size corresponding to D50 are randomly selected. In a case where the secondary particles have a spherical shape, the area is calculated by setting a length of an inter-grain-boundary distance as a diameter (μm). In a case where the secondary particles have an indefinite shape, the area is calculated through approximation to a spherical shape. Then, an average value of the five areas can be obtained as the secondary particle area (μm$^2$).

On the other hand, in the invention, each of the "primary particles" is constituted by a plurality of crystallites, and represents a particle of the smallest unit which is surrounded by a grain boundary when being observed with a scanning electron microscope (SEM, for example, at a magnification of 1000 times to 5000 times). Accordingly, the primary particle includes a single crystal and a polycrystal.

At this time, the "crystallites" represents the maximum assembly capable of being regarded as a single crystal, and can be obtained through Rietveld analysis after performing XRD measurement.

On the other hand, in the invention, the "secondary particles" or "agglomerated particles" represent particles in which several primary particles agglomerate to share a part of the outer periphery (grain boundary) of each of the primary particles, and are isolated from other particles.

(Primary Particle Area)

The primary particle area of the present lithium metal composite oxide powder is not particularly limited as long as the primary particle area/the secondary particle area is in the above-described range. As a reference of the primary particle area of the present lithium metal composite oxide powder, 0.002 μm$^2$ to 13.0 μm$^2$ is preferable, more preferably equal to or greater than 0.007 μm$^2$ or equal to or less than 13.0 μm$^2$, and still more preferably 0.01 μm$^2$ to 4.0 μm$^2$.

The primary particle area of the present lithium metal composite oxide powder can be adjusted in accordance with selection from a raw material crystal state, calcining conditions, and the like. However, there is no limitation to the adjustment method described as above.

So as to adjust the primary particle area of the present lithium metal composite oxide powder to 0.002 μm$^2$ to 13.0 μm$^2$, as described below, it is preferable to perform temporary calcining under the air atmosphere, an oxygen gas atmosphere, an atmosphere in which an oxygen partial pressure is adjusted, a carbon-dioxide-gas-containing atmosphere, or other atmospheres at a temperature equal to or higher than 650° C. and lower than 730° C., and to perform a main calcining at 830° C. to 950° C.

(Specific Surface Area)

It is preferable that a specific surface area of the present lithium metal composite oxide powder, which is obtained by a BET method, be greater than 0.3 m$^2$/g and less than 3.0 m$^2$/g, more preferably equal to or greater than 0.4 m$^2$/g or equal to or less than 2.0 m$^2$/g, and still more preferably equal to or greater than 0.7 m$^2$/g or equal to or less than 1.5 m$^2$/g.

When the specific surface area of the present lithium metal composite oxide powder is in a range of greater than 0.3 m$^2$/g and equal to or less than 3.0 m$^2$/g, a decrease in output characteristics, which is caused by too small specific area, does not occur. In addition, depletion of an electrolytic solution and deterioration in cycle characteristic which are caused by too large specific area, do not occur. Accordingly, this range is preferable.

The specific surface area can be measured in accordance with a known BET specific area measurement method by using a nitrogen adsorption method.

The specific surface area of the present lithium metal composite oxide powder can be adjusted in accordance with calcining conditions, pulverization conditions, and the like.

(Amount of S)

An amount of S in the present lithium metal composite oxide powder, that is, an amount of S that is obtained through measurement by an inductively coupled plasma (ICP) emission analyzer is preferably less than 0.10% by mass of the lithium metal composite oxide powder (100% by mass), more preferably 0.07% by mass or less, and still more preferably 0.03% by mass or less.

When the amount of S in the present lithium metal composite oxide powder is set to less than 0.10% by mass, it is possible to effectively reduce the initial resistance.

The amount of S in the present lithium metal composite oxide powder is considered as an amount that is derived mainly from S, which is contained in raw materials as an impurity during preparation of the lithium metal composite oxide powder, for example, raw materials such as a lithium compound, a manganese compound, a nickel compound, and a cobalt compound. Accordingly, so as to set the amount of S to less than 0.10% by mass, it is preferable to perform washing after the temporary calcining as described later. However, there is no limitation to the method described as above.

(Amount of Na)

An amount of Na in the present lithium metal composite oxide powder is preferably 300 ppm or less, and more preferably 200 ppm or less.

When the amount of Na in the present lithium metal composite oxide powder is set to 300 ppm or less, it is possible to effectively reduce the initial resistance.

The amount of Na can be measured by an atomic adsorption spectrometry.

The amount of Na in the present lithium metal composite oxide powder is considered as an amount that is derived mainly from Na, which is contained in raw materials as an impurity during preparation of the lithium metal composite oxide powder, for example, raw materials of a lithium compound, a manganese compound, a nickel compound, a cobalt compound, and the like. So as to set the amount of Na in the present lithium metal composite oxide to 300 ppm or less, it is preferable to perform washing after the temporary calcining as described later. Alternatively, it is preferable that at least prior to wet pulverization, raw materials other than a Li compound be subjected to a treatment including any one kind of calcining, washing, and magnetic separation, or a combination of two or more kinds thereof so as to set an amount of S in the Ni raw material to less than 0.17%, an amount of S in the Mn raw material to less than 0.24%, and an amount of S in the Co raw material to less than 0.12%, and so as to adjust an amount of magnetic substance in all of the raw materials other than the Li compound to less than 750 ppb. However, there is no limitation to the method described as above.

(Surface Residual Alkali Value/Specific Surface Area)

A surface residual alkali value per specific surface area of the present lithium metal composite oxide powder, that is, the surface residual alkali value/the specific surface area (%/(m$^2$/g)) is preferably less than 0.55, more preferably 0.35 or less, still more preferably 0.20 or less, and still more preferably 0.15 or less.

The "surface residual alkali value per specific surface area" represents an amount of an alkali component that remains on a surface of the present lithium metal composite oxide powder particles, and when this value is less than 0.55, it is possible to reduce the initial resistance.

Measurement of the surface residual alkali value can be obtained in the following procedure with reference to Winkler's method. 10.0 g of a sample is dispersed in 50 mL of ion-exchanged water, the sample is filtered, and a supernatant liquid is titrated with hydrochloric acid. Phenolphthalein and bromophenol blue are used as an indicator at this time to determine the amount of lithium hydroxide and lithium carbonate, and then an amount of Li, which is calculated from these compounds, can be calculated as the surface residual alkali value (%).

It is considered that an alkali component, which remains on the surface of the present lithium metal composite oxide powder particles, is formed mainly from a carbonate including an unreacted or surplus lithium raw material, hydroxide, and the like. However, it is assumed that an alkali component such as Na is also contained at a part.

Accordingly, so as to set the surface residual alkali value/the specific surface area in the present lithium metal composite oxide powder to less than 0.55, it is preferable to perform washing after the temporary calcining as described later. However, there is no limitation to the method described as above.

(Amount of Carbon/Specific Surface Area)

An amount of carbon per specific surface area of the present lithium metal composite oxide powder, that is, the amount of carbon/the specific surface area $(ppm/(m^2/g))$ is preferably 3000 or less. The upper limit thereof is preferably 1500 or less, more preferably 1000 or less, and still more preferably 810 or less. The lower limit thereof is preferably 50 or greater.

The amount of carbon in the present lithium metal composite oxide powder is an amount of carbon which is obtained by measuring an amount of $CO_2$ that occurs by burning particles, and may be referred to as an amount of carbon that is attached to the surface and an amount of carbon that participates in bonding between the primary particles.

It is considered that the amount of carbon is derived mainly from unreacted carbon, carbon that is included in surplus lithium carbonate, or carbon that is included in a dispersant and the like which are used during wet pulverization.

Accordingly, examples of a method of setting the amount of carbon in the present lithium metal composite oxide powder to 3000 or less include a method of performing washing after temporary calcining as described later. For example, even in the case of using lithium carbonate as a lithium raw material so as to suppress an increase in a crystallite size in a (0003) plane direction, it is possible to set the amount of carbon per specific surface area to 3000 or less by performing the washing after the temporary calcining to remove surplus carbon. However, there is no limitation to the method described as above.

In addition, even when raw materials other than a Li compound is subjected to a treatment including any one kind of calcining, washing, and magnetic separation, or a combination of two or more kinds thereof so as to adjust an amount of S and an amount of magnetic substance in the raw materials prior to the wet pulverization, it is possible to set the amount of carbon/the specific surface area $(ppm/(m^2/g))$ to 3000 or less. However, if it is desirable to further reduce the amount of carbon/the specific surface area $(ppm/(m^2/g))$, it is considered that washing is preferably performed after the temporary calcining.

(3a Site Occupancy Rate by Li)

A 3a site occupancy rate by Li in the present lithium metal composite oxide powder, that is, a 3a site occupancy rate by Li in the lithium metal composite oxide, which is obtained through Rietveld analysis by using an X-ray diffraction pattern obtained by X-ray diffraction with CuKα, is preferably equal to or greater than 0.97, more preferably equal to or greater than 0.98 or equal to or less than 1.00. When the 3a site occupancy rate by Li is high, an amount of Li which can be deintercalated during charging increases, and thus it is possible to raise charge capacity.

In this manner, when it is desirable to set the 3a site occupancy rate by Li to equal to or greater than 0.97, it is preferable that temporary calcining be performed under the air atmosphere, an oxygen gas atmosphere, an atmosphere in which an oxygen partial pressure is adjusted, a carbon-dioxide-gas-containing atmosphere, or other atmospheres at a temperature equal to or higher than 650° C. and lower than 730° C., washing is performed with water, and then main calcining is performed at a temperature of 830° C. to 950° C. Alternatively, it is preferable that at least prior to wet pulverization, raw materials other than a Li compound be subjected to a treatment including any one kind of calcining, washing, and magnetic separation, or a combination of two or more kinds thereof so as to set an amount of S in the Ni raw material to less than 0.17%, an amount of S in the Mn raw material to less than 0.24%, and an amount of S in the Co raw material to less than 0.12%, and so as to adjust an amount of magnetic substance in all of the raw materials other than the Li compound to less than 750 ppb, the temporary calcining is performed at a temperature equal to or higher than 650° C. and lower than 730, and the main calcining is performed at 830° C. to 950° C. However, there is no limitation to the method described as above.

<Amount of Magnetic Substance>

The magnetic substance represents a material that is attached to a magnet due to a magnetic force similar to iron, stainless steel, and the like. Specific examples thereof include iron, chromium, zinc, and compounds containing elements of these.

In the present lithium metal composite oxide powder, for example, it is preferable that the amount of magnetic substance which is measured by a predetermined method be set to greater than 0 ppb and less than 200 ppb when considering that voltage drop is not likely to occur during high-temperature charging and storage, and the like. It is preferable that the lower limit of the amount of the magnetic substance be zero, but practically, it is very difficult to set this amount to 0 ppb. Accordingly, practically, it is preferable that the amount of magnetic substance be set to greater than 0 and less than 200 ppb, and more preferably 2 ppb to 200 ppb in consideration of realizability. However, it is preferable to adjust the amount to a range of 5 ppb to 200 ppb, or a range of equal to or greater than 10 ppb or equal to or less than 100 ppb when considering the cost for removal.

On the other hand, whether or not abnormality occurs in facilities may be determined by measuring the amount of the magnetic substance.

The amount of the magnetic substance is a value that is measured by the following method.

Specifically, the amount of the magnetic substance can be measured as follows. 500 cc of ion-exchanged water and a piece of a cylindrical stirrer type magnet (magnet of which a magnetic force measured by using TESLA METER type TM-601 manufactured by KANETEC CO., LTD. is in a range of 100 mT to 150 mT) coated with tetrafluoroethylene are added to 100 g of material (powder) for a positive electrode active material which is put into a 500 cc resin container with a lid, and then the resin container is placed on a ball mill rotary stand and is rotated to obtain slurry. Next, the magnet is taken out from the resin container, and is immersed in ion-exchanged water to remove a surplus powder that is attached to the magnet with an ultrasonic cleaning machine. Next, the magnet is taken out from the ion-exchanged water, and is immersed in aqua regia. In the aqua regia, the magnet is warmed up at 80° C. for 30 minutes to dissolve the magnetic substance, and the aqua regia, in which the magnetic substance is dissolved, is analyzed with an ICP emission analyzer to determine amounts of iron, chromium, and zinc, respectively, and the total amount of these is set as an amount of the magnetic substance. The amount of magnetic substance can be obtained by calculating an amount of magnetic substance per weight of the amount of the material for the positive electrode active material.

The measurement method is a method of determining the amount of the magnetic substance, which is attached to the magnet, through acid dissolution of the amount of magnetic substance with reference to JIS G 1258:1999.

The magnetic substance which is attached to the magnet is present in a minute amount, and thus it is necessary to immerse the magnet to an acidic solution for acid dissolution of the magnetic substance. Here, as the magnet, a magnet coated with tetrafluoroethylene is used, and it is preferable to measure the strength of the magnet prior to the measurement.

On the other hand, even in the same type of magnets which are commercially available as a magnet having a magnetic force of, for example, 130 mT, when measuring the magnetic force by using TESLA METER type TM-601 manufactured by KANETEC CO., LTD., it can be seen that measurement values of the magnetic force deviate in a range of approximately 100 mT to 150 0 mT. On the other hand, in the case of the magnet of which the magnetic force measured as described above is in the range of approximately 100 mT to 150 mT, it is confirmed that the amount of magnetic substance defined in the invention becomes the same in each case. Accordingly, in the invention, the magnetic force of the magnet is defined to have the range of 100 mT to 150 mT in the method of measuring the amount of the magnetic substance.

In the present lithium metal composite oxide powder, so as to set the amount of the magnetic substance to greater than 0 ppb and less than 200 ppb, in a process of washing a raw material in or a process of washing a temporarily calcined powder, or in both of the processes, it is preferable to perform wet magnetic separation, to perform dry magnetic separation after a crushing and sorting process, or to perform a combination of two or more kinds of these.

On the other hand, the temporarily calcined powder is obtained by weighing raw materials of a lithium compound, a manganese compound, a nickel compound, a cobalt compound, and the like, mixing these raw materials, and temporarily calcining the resultant mixture at a temperature equal to or higher than 650° C. and lower than 730° C.

<Surface Layer>

The present lithium metal composite oxide may include a surface layer, which contains one or more kinds selected from the group consisting of titanium (Ti), aluminum (Al), and zirconium (Zr), on the entirety or a part of a surface of lithium metal composite oxide (core particle).

When the surface layer is provided, it is possible to shift an exothermic peak temperature of DSC toward a high-temperature side, and thus it is possible to increase stability of a battery. This is considered as a result of suppressing a reaction between the lithium metal composite oxide particles and an electrolytic solution.

The surface layer may contain at least any one of titanium (Ti), aluminum (Al), and zirconium (Zr). In addition, the surface layer may contain two or more kinds thereof.

The surface layer may be present in such a manner that the entirety of the core particle surface is covered with the surface layer. In addition, the surface layer may be partially present on the core particle surface, and a portion without the surface layer may be present.

When the layer is provided at the entirety or a part of the core particle surface, it is possible to suppress reaction between the core particle and the electrolytic solution, and thus it is possible to shift an exothermic peak temperature of DSC toward a high-temperature side. Accordingly, it is considered that it is possible to increase stability of a battery. In addition, the layer also has a characteristic in that the layer substantially does not have an effect on movement of lithium ions.

On the other hand, other layers may be interposed between the core particle surface and the surface layer. For example, a layer, which contains any one of a titanium oxide, an aluminum oxide, and a zirconium oxide, or two or more kinds thereof, may be interposed therebetween.

In addition, other layers may be present on a surface side of the surface layer.

From the viewpoint of shifting of an exothermic peak temperature in DSC toward a high-temperature side, and the viewpoint of raising stability of a battery, it is preferable that the thickness of the surface layer be 0.01 nm to 200 nm, more preferably equal to or greater than 0.02 nm or equal to or less than 190 nm, still more preferably equal to or greater than 0.03 nm or equal to or less than 180 nm, and still more preferably equal to or greater than 0.1 nm or equal to or less than 170 nm. The thickness of the surface layer can be measured by using energy dispersive X-ray spectrometry (EDS) and the like.

The surface layer may be formed as follows. As described later, after preparing the present lithium metal composite oxide powder (core particle powder), the lithium metal composite oxide is subjected to a surface treatment with a mixture obtained by mixing a surface treatment such as a titanium coupling agent, an aluminum coupling agent, a titanium and aluminum coupling agent, and a zirconium coupling agent with an organic solvent. Then, the organic solvent is vaporized through drying, and a heating treatment is performed at 300° C. or higher, thereby forming the surface layer.

At this time, so as to vaporize the organic solvent, for example, it is preferable that heating be performed at 40° C. to 120° C. for drying, and then a heating treatment is performed at equal to or greater than 300° C.

It is preferable that the heating treatment be performed at equal to or greater than 300° C., more preferably 400° C. to 650° C., and still more preferably equal to or greater than 460° C. or equal to or less than 600° C. When performing the heating treatment at equal to or greater than 300° C., it is possible to reduce an amount of carbon in the surface layer, and it is possible to oxidize the surface layer. In addition, it is possible to shift an exothermic peak temperature in DSC toward a high-temperature side in accordance with the kind a coupling agent, and thus it is also possible to raise stability of a battery.

<Method of Producing Present Lithium Metal Composite Oxide Powder>

Next, a method of producing the present lithium metal composite oxide powder will be described.

The present lithium metal composite oxide powder can be obtained as follows. For example, raw materials such as a lithium compound, a manganese compound, a nickel compound, and a cobalt compound are weighed, and are mixed with each other. The resultant mixture is subjected to a wet pulverization with a wet pulverizer, and then the resultant pulverized and mixed is granulated. Then, the resultant mixture granulated is temporarily calcined at a temperature equal to or higher than 650° C. and lower than 730° C., and is washed with water. Then, main calcining is performed at 830° C. to 950° C. In addition, a heat treatment may be performed as necessary, and crushing is performed under preferred conditions. In addition, sorting may be performed as necessary, thereby obtaining the present lithium metal composite oxide powder.

After the temporary calcining is performed at a temperature equal to or higher than 650° C. and lower than 730° C., washing is performed with water kept at 5° C. to 70° C., and then the main calcining is performed at 830° C. to 950° C., it is possible to suppress formation of a rock-salt structure layer, and it is possible to make the ratio (003)/(104) of the integrated intensity of the (003) plane to the integrated intensity of the (104) plane greater than 1.15.

However, in the production method, at least prior to the wet pulverization, when the raw materials other than the Li compound are subjected to the treatment including any one kind of calcining, washing, and magnetic separation, or a combination of two or more kinds thereof so as to set an amount of S in the Ni raw material to less than 0.17%, an amount of S in the Mn raw material to less than 0.24%, and an amount of S in the Co raw material to less than 0.12%, and so as to adjust an amount of magnetic substance in all of the raw materials other than the Li compound to less than 750 ppb, even though the washing is not performed after the temporary calcining, it is possible to produce the present lithium metal composite oxide powder.

In addition, at least prior to the wet pulverization, when the raw materials other than a Li compound are subjected to a treatment including any one kind of calcining, washing, and magnetic separation, or a combination of two or more kinds thereof so as to set an amount of S in the Ni raw material to less than 0.17%, an amount of S in the Mn raw material to less than 0.24%, and an amount of S in the Co raw material to less than 0.12%, and so as to adjust an amount of magnetic substance in all of the raw materials other than the Li compound to less than 750 ppb, and then the temporary calcining, the washing with water, and the main calcining are performed as described above, it is possible to attain a new effect of reducing impurities.

Examples of the lithium compound, which is a raw material, include lithium hydroxide (LiOH), lithium carbonate ($Li_2CO_3$), lithium nitrate ($LiNO_3$), $LiOH \cdot H_2O$, lithium oxide ($Li_2O$), other fatty acid lithium and lithium halide, and the like. Among these, the lithium hydroxide, the lithium carbonate, and the lithium nitrate are preferable.

Among these, it is preferable to use the lithium carbonate as a lithium raw material so as to suppress an increase in the crystallite size in a (003) plane direction. In addition, even in this case, when surplus carbonic acid is removed by performing water washing after temporary calcining, it is possible to set the amount of carbon per specific surface area to 3000 or less.

The kind of the manganese compound is not particularly limited. For example, manganese carbonate, manganese nitrate, manganese chloride, manganese dioxide, and the like can be used, and among these, manganese carbonate and manganese dioxide are preferable. In addition, in the manganese compounds, electrolytic manganese dioxide obtained by an electrolytic method is particularly preferable. In addition, manganese (III) oxide and trimanganese tetraoxide can also be used.

From the viewpoint of an amount of impurities, it is more preferable to use a manganese compound, in which the amount of S or the amount of magnetic substance is reduced by performing calcining, water washing, magnetic separation, and the like, as the manganese compound.

The kind of the nickel compound is also not particularly limited, and it is possible to use, for example, nickel carbonate, nickel nitrate, nickel chloride, nickel oxyhydroxide, nickel hydroxide, nickel oxide, and the like. Among these, nickel carbonate, nickel hydroxide, and nickel oxide are preferable.

The kind of the cobalt compound is also not particularly limited, and it is possible to use, for example, basic cobalt carbonate, cobalt nitrate, cobalt chloride, cobalt oxyhydroxide, cobalt hydroxide, cobalt oxide, and the like. Among these, basic cobalt carbonate, cobalt hydroxide, cobalt oxide, and cobalt oxyhydroxide are preferable.

In addition, it is preferable that at least prior to wet pulverization, the raw materials other than the Li compound be subjected to a treatment including any one kind of calcining, washing, and magnetic separation, or a combination of two or more kinds thereof so as to adjust an amount of S in the Ni raw material to less than 0.17%, more preferably less than 0.12%, still more preferably less than 0.07%, and still more preferably less than 0.03%. With regard to the Mn raw material, it is preferable to adjust an amount of S to less than 0.24%, more preferably less than 0.17%, still more preferably less than 0.10%, and still more preferably 0.05%. With regard to the Co raw material, it is preferable to adjust an amount of S to less than 0.12%, more preferably less than 0.06%, and still more preferably less than 0.01%. In addition, it is preferable to adjust an amount of the magnetic substance in the respective raw materials other than the Li compound to less than 750 ppb, more preferably less than 350 ppb, still more preferably less than 150 ppb, and still more preferably less than 50 ppb.

With regard to mixing of the raw materials, it is preferable that water or a liquid medium such as a dispersant be added to the raw materials, and wet mixing be performed to obtain slurry. In addition, in the case of employing the following spray-dry method, it is preferable to pulverize the obtained slurry with a wet pulverizer. However, the slurry may be subjected to dry pulverization.

A granulation method may be a wet type or a dry type as long as various raw materials which are pulverized in a previous process are dispersed in granulated particles without separation. In addition, the granulation method may be an extrusion granulation method, a rolling granulation method, a fluidized bed granulation method, a mixing granulation method, a spray dry granulation method, compression molding granulation method, or a flake granulation method using a roller and the like. However, in the case of performing the wet granulation, it is necessary to perform sufficient drying before calcining. With regard to a dry method, drying may be performed by a known dry method such as a spray thermal dry method, a hot-wind dry method, a vacuum dry method, and a freeze-dry method, and among them, the spray thermal dry method is preferable. It is preferable that the spray thermal dry method be performed by using a thermal spray dryer (spray dryer) (referred to as a "spray dry method" in this specification).

However, for example, it is also possible to prepare a coprecipitated powder, which is to be provided for calcining, through a so-called coprecipitation method (referred to as "coprecipitation method" in this specification). In the coprecipitation method, a raw material is dissolved in a solution, and conditions such as the pH are adjusted to allow the raw material to precipitate, thereby obtaining a coprecipitated powder.

On the other hand, in the spray dry method, powder strength is relatively low, and thus a void tends to occur between particles. Here, in the case of employing the spray dry method, crushing strength is further raised in comparison to a pulverization method in the related art, for example, a crushing method by using a coarse pulverizer in which the number of revolutions is set to approximately 1000 rpm. For example, it is preferable that the primary particle area/the secondary particle area in the present lithium metal composite oxide powder be further raised in comparison to a lithium metal composite oxide powder obtained by a typical spray dry method in the related art by raising the crushing strength in accordance with crushing by a high-speed rotation pulverizer and the like so as to adjust this ratio in the range defined by the invention.

On the other hand, in the coprecipitation method, the primary particles tend to increase in size, and the primary particle area/the secondary particle area tends to be high. Here, in the case of employing the coprecipitation method, in comparison to the typical coprecipitation method of the related art, it is preferable to lower the calcining temperature, to shorten the calcining time, to make the primary particle size of a coprecipitated powder small, or to perform the calcining in a carbon-dioxide-gas-containing atmosphere to reduce an average particle size of the primary particles, thereby reducing the primary particle area/the secondary particle area so as to adjust this ratio in the range defined by the invention.

After granulation as described above, it is preferable that temporary calcining be performed at a temperature equal to or higher than 650° C. and lower than 730° C., washing be performed with water, and main calcining be performed at a temperature of 830° C. to 950° C.

In a step of performing washing, if a firm layered structure is formed already, it could be seen that a rock-salt structure, which is formed during drying due to $H^+$ mixed in the Li site on a particle surface during washing, remains on the surface as is. On the other hand, in the step of performing washing, if the layered structure is not formed to a certain extent, during washing, elution of the Li ion from the inside of the particles or elution of a raw material tends to occur. Accordingly, in order to form the layered structure to a certain extent before the step of performing washing, it is important to perform the temporary calcining at a temperature equal to or higher than 650° C. and lower than 730° C.

From the viewpoint, it is preferable to perform the temporary calcining in a firing furnace in such a manner that retention is performed under the air atmosphere, an oxygen gas atmosphere, an atmosphere in which an oxygen partial pressure is adjusted, a carbon-dioxide-gas-containing atmosphere, or other atmospheres at a temperature (represents a temperature in the case of bringing a thermocouple into contact with an object to be calcined in the firing furnace) equal to or higher than 650° C. and lower than 730° C., more preferably equal to or greater than 670° C. or equal to or less than 720° C., and still more preferably equal to or greater than 690° C. or equal to or less than 710° C. for 0.5 hours to 30 hours.

The kind of the firing furnace is not particularly limited, and the calcining can be performed by using a rotary kiln, a stationary furnace, and other firing furnaces.

The water used in the washing may be city water, but it is preferable to use ion-exchanged water that passes through a filter or wet magnetic separator or deionized water.

The pH of water is preferably 5 to 9.

With regard to a liquid temperature during the washing, if the liquid temperature during washing is high, the Li ion is eluted, and thus the liquid temperature is preferably 5° C. to 70° C. from the viewpoint, more preferably equal to or less than 60° C., still more preferably equal to or less than 45° C., and still more preferably equal to or less than 30° C.

With regard to an amount of water that is brought into contact with the present lithium metal composite oxide, it is preferable that a mass ratio (also referred to as "slurry concentration") of the present lithium metal composite oxide powder to water be adjusted to 10% by weight to 70% by weight, more preferably equal to or greater than 20% by weight or equal to or less than 60% by weight, and still more preferably equal to or greater than 30% by weight or equal to or less than 50% by weight. When the amount of water is equal to or greater than 10% by weight, it is easy to elute impurities such as S. In contrast, when the amount of water is equal to or less than 70% by weight, it is possible to obtain a washing effect appropriate for the amount of water.

It is preferable to perform the main calcining in a firing furnace in such a manner that retention is performed under the air atmosphere, an oxygen gas atmosphere, an atmosphere in which an oxygen partial pressure is adjusted, a carbon-dioxide-gas-containing atmosphere, or other atmospheres at a temperature (represents a temperature in the case of bringing a thermocouple into contact with an object to be calcined in the firing furnace) equal to or higher than 830° C. and lower than 950° C., more preferably 850° C. to 910° C., and still more preferably 850° C. to 900° C. for 0.5 hours to 30 hours. At this time, it is preferable to select calcining conditions at which a transition metal or a typical element forms a solid-solution at an atomic level and exhibits a single phase.

The kind of the firing furnace is not particularly limited. The calcining can be performed, for example, by using a rotary kiln, a stationary furnace, and other firing furnaces.

It is preferable that a heat treatment after the main calcining be performed in a case where it is necessary for a crystal structure to be adjusted, and the heat treatment may be performed under an oxidation atmosphere conditions such as under the air atmosphere, under an oxygen gas atmosphere, and under an atmosphere in which an oxygen partial pressure is adjusted.

With regard to crushing after the main calcining or the heat treatment, it is preferable that crushing be performed by using the high-speed rotary pulverizer and the like as described above. When the crushing is performed with the high-speed rotary pulverizer, it is possible to crush a portion at which particles are agglomerated to each other, or a weakly sintered portion, and it is also possible to suppress particles from being deformed. However, there is no limitation to the high-speed rotary pulverizer.

One example of the high-speed rotary pulverizer includes a pin mill. The pin mill is known as a disk rotary type pulverizer, and is a crusher in a type in which when a pin-equipped rotary disk rotates, the inside enters a negative pressure state, and thus powder is suctioned from a raw material supply port. Accordingly, fine particles are light in weight, and thus tends to ride on an air current and pass through a clearance in the pin mill. On the other hand, coarse particles are reliably crushed. Accordingly, when crushing is performed with the pin mill, it is possible to loose reliably agglomeration between particles, or the weakly sintered portion. In addition, it is possible to prevent the particles from being deformed.

The number of revolutions of the high-speed rotary pulverizer is preferably equal to or greater than 4000 rpm, more preferably 5000 rpm to 12000 rpm, and still more preferably 7000 rpm to 10000 rpm.

Sorting, which is performed after the main calcining, has a technical meaning of particle size distribution adjustment of agglomerated particles and removal of foreign matters, and thus it is preferable to perform the sorting by selecting a sieve with a preferred mesh size.

(Magnetic Separation)

Magnetic separation, that is, a treatment of removing impurities, which are magnetically attracted to a magnet, from the present lithium metal composite oxide powder may be performed as necessary. When the magnetic separation is performed, it is possible to remove impurities which become the cause of short-circuit.

The magnetic separation may be performed at arbitrary timing in the present production method. For example, it is preferable to perform the magnetic separation after a washing process, or after crushing or pulverization which is finally performed. When performing the magnetic separation after the final crushing or pulverization, it is possible to finally remove iron and the like which are mixed-in due to damage of a crusher or a pulverizer.

As a magnetic separation method, either a dry magnetic separation method in which the present lithium metal composite oxide powder in a dry state is brought into contact with a magnet, or a wet magnetic separation method in which raw materials other than a Li compound or slurry of temporarily calcined powder is brought into contact with a magnet is possible.

From the viewpoint of magnetic separation efficiency, the wet magnetic separation method is more preferable when considering that the raw materials other than the Li compound, which are in a further dispersed state, that is, in a non-agglomerated state, or the temporarily calcined powder can be brought into contact with the magnet.

In the case of performing the magnetic separation after washing, it is preferable to select the wet magnetic separation method when considering the magnetic separation may be combined with the washing process. In contrast, in the case of performing the magnetic separation after crushing or pulverization which is finally performed, it is preferable to employ the dry magnetic separation method when considering that it is not necessary to perform drying after the magnetic separation.

In the case of performing the wet magnetic separation method in combination with a washing process, in the washing process, raw materials or a temporarily calcined powder and a polar solvent are mixed and stirred to obtain slurry. The slurry that is obtained in the magnetic separation process is put into a wet magnetic separator to perform magnetic separation. Then, filtration is performed. According to this, it is possible to effectively separate and remove impurities separated in the washing process and impurities separated in the magnetic separation process, respectively, from the raw materials or the temporarily calcined powder.

The wet magnetic separator has an arbitrary structure. Examples of the wet magnetic separator include a magnetic separator having a configuration in which a filter- or fin-shaped magnet is disposed in a pipe, and the like.

It is preferable that a magnetic force (magnetic force at a location at which the present lithium metal composite oxide powder comes into contact with a magnet) of the magnet used for the magnetic separation be 5000 G to 20000 G (Gauss), more preferably equal to or greater than 10000 G or equal to or less than 20000 G, and still more preferably equal to or greater than 12000 G or equal to or less than 20000 G.

When the magnetic force of the magnet is equal to or greater than 5000 G, it is possible to obtain a desired magnetic separation effect. On the other hand, when the magnetic force of the magnet is equal to or less than 20000 G, it is possible to prevent a necessary substance from being removed.

<Characteristics and Use of Present Lithium Metal Composite Oxide Powder>

After being crushed and sorted as necessary, the present lithium metal composite oxide powder can be effectively used as a positive electrode active material of a lithium battery.

For example, it is possible to produce a positive electrode mixture by mixing the present lithium metal composite oxide powder, a conductive material such as carbon black, and a binding agent such as Teflon (Teflon is a registered trade mark of DUPONT Corporation in USA) binder. In addition, the positive electrode mixture is used in a positive electrode, for example, a material such as lithium or carbon which is capable of intercalating and deintercalating lithium ions is used in a negative electrode, and a material, which is obtained by dissolving a lithium salt such as lithium hexafluorophosphate ($LiPF_6$) in a mixed solvent such as ethylene carbonate and dimethylcarbonate, is used in a nonaqueous electrolyte, thereby constructing a lithium secondary battery. However, there is no limitation to the battery having the above-described configuration.

When being used while repeating charging and discharging, the lithium battery including the present lithium metal composite oxide powder as the positive electrode active material exhibits excellent charge-discharge cycle ability (cycle characteristics), and thus is particularly excellent in a use of a positive electrode active material of a lithium battery that is used as a motor drive power supply mounted on an electric vehicle (EV) or a hybrid electric vehicle (HEV).

Here, the "hybrid vehicle" is a vehicle that uses two power sources including an electric motor and an internal combustion engine in combination with each other.

In addition, the "lithium battery" is intended to include all batteries such as a lithium primary battery, a lithium secondary battery (including a lithium ion secondary battery), and a lithium polymer battery which contain lithium or lithium ions in batteries.

<Description of Words and Phrases>

In this specification, expression of "X to Y" (X and Y represent an arbitrary number) is intended to also include a meaning of "preferably greater than X" or "preferably less than Y" unless otherwise stated in addition to a meaning of "equal to or greater than X and equal to or less than Y".

In addition, expression of "X or greater" (X represents an arbitrary number) or "Y or less" (Y is an arbitrary number" is intended to also include a meaning of "preferably greater than X" or "preferably less than Y".

EXAMPLES

Next, the invention will be further described on the basis of Examples and Comparative Examples. However, the invention is not limited to the following Examples.

Example 1

Polycarboxylic acid ammonium salt (SN dispersant 5468, manufactured by San Nopco Ltd.) as a dispersant was added to ion-exchanged water in such a manner that a solid content in slurry became 6% by weight, and was sufficiently dissolved in and mixed with the ion-exchanged water.

Lithium carbonate having D50 of 7 µm, electrolytic manganese dioxide having D50 of 23 µm and a specific surface area of 40 m²/g, nickel hydroxide having D50 of 22 µm, and cobalt oxyhydroxide having D50 of 14 µm were weighed in a molar ratio of Li:Mn:Ni:Co=1.07:0.25:0.50:0.18, and were mixed in the ion-exchanged water, in which the dispersant was dissolved in advance, in this order, and the resultant mixture was stirred, thereby preparing slurry having a solid content concentration of 50% by weight. The resultant mixture was pulverized with a wet pulverizer at 1300 rpm for 40 minutes, thereby setting D50 to 0.55 μm.

The resultant pulverized slurry that was obtained was granulated and dried by using a thermal spray dryer (spray dryer, OC-16, manufactured by Ohkawara Kakohki Co., Ltd.). At this time, a rotary disk was used for spraying, and granulation and drying were performed under conditions in which the number of revolutions was set to 24000 rpm, a slurry supply rate was set to 3 kg/hr, and a temperature was adjusted so that an outlet temperature of a drying tower became 100° C.

The resultant granulated powder that was obtained was temporarily calcined by using a stationary electric furnace in the air at 700° C. The temporarily calcined powder that was obtained, and ion-exchanged water (pH: 5.8, a water temperature: 25° C.) were mixed with each other, and washing was performed by stirring the resultant mixture for 10 minutes, thereby obtaining slurry (slurry concentration: 33% by mass). The temporarily calcined powder that was filtered was dried at 170° C., and was calcined by using a stationary electric furnace at 860° C. for 20 hours.

A fired aggregation that was obtained through the calcining was put into a mortar and was crushed with a pestle. A powder under a sieve, which was sieved with a sieve having a mesh of 5 mm, was crushed with a high-speed rotary pulverizer (pin mill, manufactured by Makino Mfg. Co., Ltd) (crushing condition: the number of revolutions of 10000 rpm), and sorted with a sieve having a mesh of 53 μm, thereby collecting lithium metal composite oxide powder (sample) under the sieve.

From chemical analysis performed on the lithium metal composite oxide powder (sample) that was collected, it could be seen that a composition was $Li_{1.04}Ni_{0.52}Co_{0.19}Mn_{0.25}O_2$.

Example 2

A lithium metal composite oxide powder (sample) was produced in the same manner in Example 1 except that the temporarily calcined powder after the washing was calcined at 880° C.

Example 3

A lithium metal composite oxide powder (sample) was prepared in the same manner in Example 1 except that the temporarily calcined powder after the washing was calcined at 900° C.

Example 4

Lithium carbonate having D50 of 8 μm, electrolytic manganese dioxide having D50 of 23 μm and a specific surface area of 40 m²/g, nickel hydroxide having D50 of 22 μm, and cobalt oxyhydroxide having D50 of 14 μm were weighed in a molar ratio of Li:Mn:Ni:Co=1.06:0.26:0.50:0.18, and were mixed in the ion-exchanged water, in which the dispersant was dissolved in advance, in this order similar to Example 1, and the resultant mixture was stirred, thereby preparing slurry having a solid content concentration of 50% by weight. The resultant mixture was pulverized with a wet pulverizer at 1300 rpm for 40 minutes, thereby setting D50 to 0.55 μm.

The resultant pulverized slurry that was obtained was granulated and dried by using a thermal spray dryer (spray dryer, OC-16, manufactured by Ohkawara Kakohki Co., Ltd.). At this time, a rotary disk was used for spraying, and granulation and drying were performed under conditions in which the number of revolutions was set to 24000 rpm, a slurry supply rate was set to 3 kg/hr, and a temperature was adjusted so that an outlet temperature of a drying tower became 100° C.

The resultant granulated powder that was obtained was temporarily calcined by using a stationary electric furnace in the air at 700° C. The temporarily calcined powder that was obtained, and ion-exchanged water (pH: 5.8, a water temperature: 25° C.) were mixed with each other, and washing was performed by stirring the resultant mixture for 10 minutes, thereby obtaining slurry (slurry concentration: 33% by mass). Subsequently, the temporarily calcined powder that was filtered was dried at 170° C., and was calcined by using a stationary electric furnace at 900° C. for 20 hours.

A fired aggregation that was obtained through the calcining was put into a mortar and was crushed with a pestle, and was sorted with a sieve having a mesh of 53 μm, thereby collecting a composite oxide powder (sample) under the sieve.

The sample, which was collected, was pulverized by using a sorting-mechanism-equipped collision type pulverizer (counter jet mill "100AFG/50ATP", manufactured by Hosokawa Micron Group) under conditions in which the number of revolutions of a sorting rotor was set to 7500 rpm, a pulverization air pressure was set to 0.6 Mpa, three pulverizing nozzles of 0:2.5 were used, and a powder supply rate was set to 4.5 kg/h, thereby obtaining a lithium metal composite oxide powder (sample). From chemical analysis performed on the lithium metal composite oxide powder (sample) that was collected, it could be seen that a composition was $Li_{1.03}Ni_{0.52}Co_{0.19}Mn_{0.26}O_2$.

Example 5

Polycarboxylic acid ammonium salt (SN dispersant 5468, manufactured by San Nopco Ltd.) as a dispersant was added to ion-exchanged water in such a manner that a solid content in slurry became 6% by weight, and was sufficiently dissolved in and mixed with the ion-exchanged water.

Lithium carbonate having D50 of 7 μm, electrolytic manganese dioxide having D50 of 23 μm and a specific surface area of 40 m²/g, nickel hydroxide having D50 of 22 μm, and cobalt oxyhydroxide having D50 of 14 μm were weighed in a molar ratio of Li:Mn:Ni:Co=1.04:0.19:0.58:0.19, and were mixed in the ion-exchanged water, in which the dispersant was dissolved in advance, in this order, and the resultant mixture was stirred, thereby preparing slurry having a solid content concentration of 50% by weight. The resultant mixture was pulverized with a wet pulverizer at 1300 rpm for 40 minutes, thereby setting D50 to 0.55 μm.

The resultant pulverized slurry that was obtained was granulated and dried by using a thermal spray dryer (spray dryer, OC-16, manufactured by Ohkawara Kakohki Co., Ltd.). At this time, a rotary disk was used for spraying, and granulation and drying were performed under conditions in which the number of revolutions was set to 24000 rpm, a slurry supply rate was set to 3 kg/hr, and a temperature was adjusted so that an outlet temperature of a drying tower became 100° C.

The resultant granulated powder that was obtained was temporarily calcined by using a stationary electric furnace in the air at 700° C. The temporarily calcined powder that was obtained, and ion-exchanged water (pH: 5.8, a water temperature: 25° C.) were mixed with each other, and washing was performed by stirring the resultant mixture for 10 minutes, thereby obtaining slurry (slurry concentration: 33% by mass). Subsequently, the temporarily calcined powder that was filtered was dried at 170° C., and was then calcined by using a stationary electric furnace in an oxygen atmosphere at 900° C. for 20 hours.

A fired aggregation that was obtained through the calcining was put into a mortar and was crushed with a pestle. A powder under a sieve, which was sieved with a sieve having a sieve mesh of 5 mm, was crushed with a high-speed rotary pulverizer (pin mill, manufactured by Makino Mfg. Co., Ltd.) (crushing condition: the number of revolutions of 8000 rpm), and sorted with a sieve having a mesh of 53 μm, thereby collecting lithium metal composite oxide powder (sample) under the sieve.

From chemical analysis performed on the lithium metal composite oxide powder (sample) that was collected, it could be seen that a composition was $Li_{1.01}Ni_{0.59}Co_{0.20}Mn_{0.20}O_2$.

Example 6

Polycarboxylic acid ammonium salt (SN dispersant 5468, manufactured by San Nopco Ltd.) as a dispersant was added to ion-exchanged water in such a manner that a solid content in slurry became 6% by weight, and was sufficiently dissolved in and mixed with the ion-exchanged water.

Lithium carbonate having D50 of 7 μm, electrolytic manganese dioxide having D50 of 23 μm and a specific surface area of 40 m$^2$/g, cobalt oxyhydroxide having D50 of 14 μm, nickel hydroxide having D50 of 22 μm, and aluminum hydroxide having D50 of 2 μm were weighed in a molar ratio of Li:Mn:Ni:Co:Al=1.06:0.25:0.50:0.18:0.01, and were mixed in the ion-exchanged water, in which the dispersant was dissolved in advance, in this order, and the resultant mixture was stirred, thereby preparing slurry having a solid content concentration of 50% by weight. The resultant mixture was pulverized with a wet pulverizer at 1300 rpm for 40 minutes, thereby setting D50 to 0.55 μm.

The resultant pulverized slurry that was obtained was granulated and dried by using a thermal spray dryer (spray dryer, OC-16, manufactured by Ohkawara Kakohki Co., Ltd.). At this time, a rotary disk was used for spraying, and granulation and drying were performed under conditions in which the number of revolutions was set to 24000 rpm, a slurry supply rate was set to 3 kg/hr, and a temperature was adjusted so that an outlet temperature of a drying tower became 100° C.

The resultant granulated powder that was obtained was temporarily calcined by using a stationary electric furnace in the air at 700° C. The temporarily calcined powder that was obtained, and ion-exchanged water (pH: 5.8, a water temperature: 25° C.) were mixed with each other, and washing was performed by stirring the resultant mixture for 10 minutes, thereby obtaining slurry (slurry concentration: 33% by mass). Subsequently, the temporarily calcined powder that was filtered was dried at 170° C., and was then calcined by using a stationary electric furnace at 900° C. for 20 hours.

A fired aggregation that was obtained through the calcining was put into a mortar and was crushed with a pestle. A powder under a sieve, which was sieved with a sieve having a sieve mesh of 5 mm, was crushed with a high-speed rotary pulverizer (pin mill, manufactured by Makino Mfg. Co., Ltd.) (crushing condition: the number of revolutions of 10000 rpm), and sorted with a sieve having a mesh of 53 μm, thereby collecting lithium metal composite oxide powder (sample) under the sieve.

From chemical analysis performed on the lithium metal composite oxide powder (sample) that was collected, it could be seen that a composition was $Li_{1.03}Ni_{0.52}Co_{0.19}Mn_{0.25}Al_{0.01}O_2$.

Example 7

Polycarboxylic acid ammonium salt (SN dispersant 5468, manufactured by San Nopco Ltd.) as a dispersant was added to ion-exchanged water in such a manner that a solid content in slurry became 6% by weight, and was sufficiently dissolved in and mixed with the ion-exchanged water.

Lithium carbonate having D50 of 7 μm, electrolytic manganese dioxide having D50 of 23 μm and a specific surface area of 40 m$^2$/g, nickel hydroxide having D50 of 22 μm, cobalt oxyhydroxide having D50 of 14 μm, and magnesium hydroxide having D50 of 3 μm were weighed in a molar ratio of Li:Mn:Ni:Co:Mg=1.06:0.25:0.50:0.18:0.01, and were mixed in the ion-exchanged water, in which the dispersant was dissolved in advance, in this order, and the resultant mixture was stirred, thereby preparing slurry having a solid content concentration of 50% by weight. The resultant mixture was pulverized with a wet pulverizer at 1300 rpm for 40 minutes, thereby setting D50 to 0.55 μm.

The resultant pulverized slurry that was obtained was granulated and dried by using a thermal spray dryer (spray dryer, OC-16, manufactured by Ohkawara Kakohki Co., Ltd.). At this time, a rotary disk was used for spraying, and granulation and drying were performed under conditions in which the number of revolutions was set to 24000 rpm, a slurry supply rate was set to 3 kg/hr, and a temperature was adjusted so that an outlet temperature of a drying tower became 100° C.

The resultant granulated powder that was obtained was temporarily calcined by using a stationary electric furnace in the air at 700° C. The temporarily calcined powder that was obtained, and ion-exchanged water (pH: 5.8, a water temperature: 25° C.) were mixed with each other, and washing was performed by stirring the resultant mixture for 10 minutes, thereby obtaining slurry (slurry concentration: 33% by mass). Subsequently, the temporarily calcined powder that was filtered was dried at 170° C., and was then calcined by using a stationary electric furnace at 900° C. for 20 hours.

A fired aggregation that was obtained through the calcining was put into a mortar and was crushed with a pestle. A powder under a sieve, which was sieved with a sieve having a sieve mesh of 5 mm, was crushed with a high-speed rotary pulverizer (pin mill, manufactured by Makino Mfg. Co., Ltd.) (crushing condition: the number of revolutions of 10000 rpm), and sorted with a sieve having a mesh of 53 μm, thereby collecting lithium metal composite oxide powder (sample) under the sieve.

From chemical analysis performed on the lithium metal composite oxide powder (sample) that was collected, it could be seen that a composition was $Li_{1.03}Ni_{0.52}Co_{0.19}Mn_{0.25}Mg_{0.01}O_2$.

Example 8

Polycarboxylic acid ammonium salt (SN dispersant 5468, manufactured by San Nopco Ltd.) as a dispersant was added to ion-exchanged water in such a manner that a solid content in slurry became 6% by weight, and was sufficiently dissolved in and mixed with the ion-exchanged water.

Lithium carbonate having D50 of 7 μm, electrolytic manganese dioxide having D50 of 23 μm and a specific surface area of 40 m$^2$/g, nickel hydroxide having D50 of 22 μm, cobalt oxyhydroxide having D50 of 14 μm, and titanium hydroxide having D50 of 2 μm were weighed in a molar ratio of Li:Mn:Ni:Co:Ti=1.06:0.25:0.50:0.18:0.01, and were mixed in the ion-exchanged water, in which the dispersant was dissolved in advance, in this order, and the resultant mixture was stirred, thereby preparing slurry having a solid content concentration of 50% by weight. The resultant mixture was pulverized with a wet pulverizer at 1300 rpm for 40 minutes, thereby setting D50 to 0.55 μm.

The resultant pulverized slurry that was obtained was granulated and dried by using a thermal spray dryer (spray dryer, OC-16, manufactured by Ohkawara Kakohki Co., Ltd.). At this time, a rotary disk was used for spraying, and granulation and drying were performed under conditions in which the number of revolutions was set to 24000 rpm, a slurry supply rate was set to 3 kg/hr, and a temperature was adjusted so that an outlet temperature of a drying tower became 100° C.

The resultant granulated powder that was obtained was temporarily calcined by using a stationary electric furnace in the air at 700° C. The temporarily calcined powder that was obtained, and ion-exchanged water (pH: 5.8, a water temperature: 25° C.) were mixed with each other, and washing was performed by stirring the resultant mixture for 10 minutes, thereby obtaining slurry (slurry concentration: 33% by mass). Subsequently, the temporarily calcined powder that was filtered was dried at 170° C., and was then calcined by using a stationary electric furnace at 900° C. for 20 hours.

A fired aggregation that was obtained through the calcining was put into a mortar and was crushed with a pestle. A powder under a sieve, which was sieved with a sieve having a sieve mesh of 5 mm, was crushed with a high-speed rotary pulverizer (pin mill, manufactured by Makino Mfg. Co., Ltd.) (crushing condition: the number of revolutions of 10000 rpm), and sorted with a sieve having a mesh of 53 μm, thereby collecting lithium metal composite oxide powder (sample) under the sieve.

From chemical analysis performed on the lithium metal composite oxide powder (sample) that was collected, it could be seen that a composition was $Li_{1.03}Ni_{0.52}Co_{0.19}Mn_{0.25}Ti_{0.01}O_2$.

Example 9

A polycarboxylic acid ammonium salt aqueous solution (SN dispersant 5468, manufactured by San Nopco Ltd.) as a dispersant was added to ion-exchanged water. An amount of the dispersant that was added was set to 6% by weight on the basis of the total amount of a Ni raw material, a Mn raw material, a Co raw material, a Li raw material, and the like as described later, and the dispersant was sufficiently dissolved in and mixed with the ion-exchanged water.

Nickel hydroxide, which is a raw material, was stirred in ion-exchanged water that was warmed to 60° C. to obtain slurry, and a NaOH aqueous solution was added dropwise to the slurry, thereby reducing an amount of S. After the slurry was allowed to pass through a wet magnetic separator, and was subjected to filtration, washing, and drying, the amount of S in the nickel hydroxide was 0.07%. Next, the Na-neutralized electrolytic manganese dioxide was calcined at 950° C., thereby obtaining trimanganese tetraoxide. The obtained trimanganese tetraoxide was mixed with ion-exchanged water, and was washed through stirring for 10 minutes, thereby obtaining slurry. The slurry was allowed to flow through the inside of a wet magnetic separator, and then was subjected to filtration under reduced pressure. Next, trimanganese tetraoxide that was filtered was heated and dried in the air at 350° C. (article temperature) for a retention time of 5 hours. From measurement of the amount of S in the obtained trimanganese tetraoxide, it could be seen that the amount of S was 0.10%.

Subsequently, cobalt oxyhydroxide was stirred in ion-exchanged water that was kept at 25° C., thereby obtaining slurry. The slurry was allowed to pass through a wet magnetic separator, and was subjected to filtration, washing, and drying. The amount of S in the cobalt oxyhydroxide at this time was 0.01%. Lithium carbonate having D50 of 7 μm, and the trimanganese tetraoxide, the nickel hydroxide, and the cobalt oxyhydroxide, which were described above, were weighed in a molar ratio of Li:Mn:Ni:Co=1.04:0.26:0.52:0.18, and were mixed in the ion-exchanged water in which the dispersant was dissolved in advance, and the resultant mixture was stirred, thereby preparing slurry having a solid content concentration of 50% by weight. The resultant mixture was pulverized with a wet pulverizer at 1300 rpm for 40 minutes, thereby setting D50 to 0.55 μm.

The resultant pulverized slurry that was obtained was granulated and dried by using a thermal spray dryer (spray dryer, OC-16, manufactured by Ohkawara Kakohki Co., Ltd.). At this time, a rotary disk was used for spraying, and granulation and drying were performed under conditions in which the number of revolutions was set to 24000 rpm, a slurry supply rate was set to 3 kg/hr, and a temperature was adjusted so that an outlet temperature of a drying tower became 100° C.

The resultant granulated powder that was obtained was temporarily calcined by using a stationary electric furnace in the air at 700° C. Subsequently, the resultant temporarily calcined powder was calcined by using a stationary electric furnace at 900° C. for 20 hours.

A fired aggregation that was obtained through the calcining was put into a mortar and was crushed with a pestle. A powder under a sieve, which was sieved with a sieve having a sieve mesh of 5 mm, was crushed with a high-speed rotary pulverizer (pin mill, manufactured by Makino Mfg. Co., Ltd.) (crushing condition: the number of revolutions of 10000 rpm), and sorted with a sieve having a mesh of 53 μm, thereby collecting lithium metal composite oxide powder (sample) under the sieve.

From chemical analysis performed on the lithium metal composite oxide powder (sample) that was collected, it could be seen that a composition was $Li_{1.04}Ni_{0.52}Co_{0.19}Mn_{0.25}O_2$.

Example 10

First, sodium hydroxide and ammonia were fed to an aqueous solution in which nickel sulfate, cobalt sulfate, and manganese sulfate were dissolved, and a metal composite hydroxide, in which a molar ratio of nickel, cobalt, and manganese was 0.54:0.19:0.27, was prepared through a coprecipitation method. The obtained metal composite hydroxide was stirred in ion-exchanged water that was warmed up to 60° C., thereby obtaining slurry. A NaOH aqueous solution was added dropwise to the slurry, thereby reducing an amount of S. After the slurry was allowed to pass through a wet magnetic separator, and was subjected to filtration, washing, and drying, the amount of S in the metal composite hydroxide was 0.09%.

The metal composite hydroxide, which was prepared in this manner, was constituted by spherical secondary particles in which a plurality of primary particles having a size of 1 μm or less were assembled, and D50 and a tap density of the obtained metal composite hydroxide were 10 μm and 2.3 g/cm$^3$, respectively.

Subsequently, a polycarboxylic acid ammonium salt aqueous solution (SN dispersant 5468, manufactured by San Nopco Ltd.) as a dispersant was added to ion-exchanged water. An amount of the dispersant that was added was set to 6% by weight on the basis of the total amount of the metal composite hydroxide and a Li raw material to be described later, and the dispersant was sufficiently dissolved in and mixed with the ion-exchanged water.

The metal composite hydroxide having D50 of 10 μm, and lithium carbonate having D50 of 7 μm were weighed to be a molar ratio of Li:Mn:Ni:Co=1.03:0.27:0.52:0.18, and were mixed and stirred in the above-described ion-exchanged water in which the dispersant was dissolved in advance, thereby preparing slurry having a solid content concentration of 50% by weight. The resultant mixture was pulverized with a wet pulverizer at 1300 rpm for 60 minutes, thereby setting D50 to 0.55 μm.

The resultant pulverized slurry that was obtained was granulated and dried by using a thermal spray dryer (spray dryer, OC-16, manufactured by Ohkawara Kakohki Co., Ltd.). At this time, a rotary disk was used for spraying, and granulation and drying were performed under conditions in which the number of revolutions was set to 24000 rpm, a slurry supply rate was set to 3 kg/hr, and a temperature was adjusted so that an outlet temperature of a drying tower became 100° C.

The resultant granulated powder that was obtained was temporarily calcined by using a stationary electric furnace in the air at 700° C. Subsequently, the temporarily calcined powder was calcined by using a stationary electric furnace at 900° C. for 20 hours.

A fired aggregation that was obtained through the calcining was put into a mortar and was crushed with a pestle. A powder under a sieve, which was sieved with a sieve having a sieve mesh of 5 mm, was crushed with a high-speed rotary pulverizer (pin mill, manufactured by Makino Mfg. Co., Ltd.) (crushing condition: the number of revolutions of 10000 rpm), and sorted with a sieve having a mesh of 53 μm, thereby collecting lithium metal composite oxide powder (sample) under the sieve.

From chemical analysis performed on the lithium metal composite oxide powder (sample) that was collected, it could be seen that a composition was $Li_{1.04}Ni_{0.52}Co_{0.19}Mn_{0.25}O_2$.

Example 11

A lithium metal composite oxide powder (sample) was produced in the same manner as in Example 3.

98 parts by mass of the lithium metal composite oxide powder that was obtained as described above, 1 part by mass of an aluminum coupling agent (PLENACT (registered trade mark) AL-M, manufactured by Ajinomoto Fine-Techno Co., Inc.) as a surface treatment agent, and 1 part by mass of isopropyl alcohol as a solvent were mixed by using a cutter mill ("millser 720G", manufactured by Iwatani Corporation), and the resultant mixture was subjected to a heat treatment in the air at 500° C. for 5 hours, thereby obtaining a surface-treated lithium metal composite oxide powder (sample).

With respect to the lithium metal composite oxide powder (sample) that was prepared as described above, a cross-section in the vicinity of a particle surface was observed with a transmission electron microscope ("JEM-ARM200F", manufactured by JEOL Ltd.). From the observation, it could be seen that a surface layer was partially present on a surface of a core portion that was constituted by the lithium metal composite oxide. In addition, from analysis performed with EDS with respect to the surface layer, it could be seen that the surface layer contained aluminum (Al). The thickness of the surface layer was different depending on a site. The thickness of a thin portion was 0.03 nm, and the thickness of a thick portion was 10 nm.

Example 12

A lithium metal composite oxide powder (sample) was produced in the same manner as in Example 3.

98 parts by mass of the lithium metal composite oxide powder that was obtained as described above, 1 part by mass of a titanium coupling agent (PLENACT (registered trade mark) KR-46B, manufactured by Ajinomoto Fine-Techno Co., Inc.) as a surface treatment agent, and 1 part by mass of isopropyl alcohol as a solvent were mixed by using a cutter mill ("millser 720G", manufactured by Iwatani Corporation), and the resultant mixture was subjected to a heat treatment in the air at 500° C. for 5 hours, thereby obtaining a surface-treated lithium metal composite oxide powder (sample).

With respect to the lithium metal composite oxide powder (sample) that was prepared as described above, a cross-section in the vicinity of a particle surface was observed with a transmission electron microscope ("JEM-ARM200F", manufactured by JEOL Ltd.). From the observation, it could be seen that a surface layer was partially present on a surface of a core portion that was constituted by a spinel-type composite oxide containing lithium and manganese. In addition, from analysis performed with EDS with respect to the surface layer, it could be seen that the surface layer contained titanium (Ti). In addition, the thickness of the surface layer was different depending on a site. The thickness of a thin portion was 0.03 nm, and the thickness of a thick portion was 14 nm.

Example 13

A lithium metal composite oxide powder (sample) was produced in the same manner as in Example 3.

98 parts by mass of the lithium metal composite oxide powder that was obtained as described above, 0.5 part by mass of an aluminum coupling agent (PLENACT (registered trade mark) AL-M, manufactured by Ajinomoto Fine-Techno Co., Inc.) as a surface treatment agent, 0.5 part by mass of a titanium coupling agent (PLENACT (registered trade mark) KR-46B, manufactured by Ajinomoto Fine-Techno Co., Inc.) as a surface treatment agent, and 1 part by mass of isopropyl alcohol as a solvent were mixed by using a cutter mill ("millser 720G", manufactured by Iwatani Corporation), and the resultant mixture was subjected to a heat treatment in the air at 500° C. for 5 hours, thereby obtaining a surface-treated lithium metal composite oxide powder (sample).

With respect to the lithium metal composite oxide powder (sample) that was prepared as described above, a cross-section in the vicinity of a particle surface was observed with a transmission electron microscope ("JEM-ARM200F", manufactured by JEOL Ltd.). From the observation, it could be seen that a surface layer was partially present on a surface of a core portion that was constituted by a spinel-type composite oxide containing lithium and manganese. In addition, from analysis performed with EDS with respect to the surface layer, it could be seen that the surface layer contained aluminum (Al) and titanium (Ti). In addition, the thickness of the surface layer was different depending on a site. The thickness of a thin portion was 0.03 nm, and the thickness of a thick portion was 12 nm.

Comparative Example 1

Polycarboxylic acid ammonium salt (SN dispersant 5468, manufactured by San Nopco Ltd.) as a dispersant was added to ion-exchanged water in such a manner that a solid content in slurry became 6% by weight, and was sufficiently dissolved in and mixed with the ion-exchanged water.

Lithium carbonate having D50 of 8 μm, electrolytic manganese dioxide having D50 of 23 μm and a specific surface area of 40 m$^2$/g, cobalt oxyhydroxide having D50 of 14 μm, and nickel hydroxide having D50 of 22 μm were weighed in a molar ratio of Li:Mn:Ni:Co=1.04:0.26:0.51:0.19, and were mixed in the ion-exchanged water, in which the dispersant was dissolved in advance, in this order, and the resultant mixture was stirred, thereby preparing slurry having a solid content concentration of 50% by weight. The resultant mixture was pulverized with a wet pulverizer at 1300 rpm for 40 minutes, thereby setting D50 to 0.55 μm.

The resultant pulverized slurry that was obtained was granulated and dried by using a thermal spray dryer (spray dryer, OC-16, manufactured by Ohkawara Kakohki Co., Ltd.). At this time, a rotary disk was used for spraying, and granulation and drying were performed under conditions in which the number of revolutions was set to 24000 rpm, a slurry supply rate was set to 3 kg/hr, and a temperature was adjust so that an outlet temperature of a drying tower became 100° C.

The resultant granulated powder that was obtained was temporarily calcined by using a stationary electric furnace in the air at 450° C. Subsequently, the temporarily calcined powder was calcined by using a stationary electric furnace at 910° C. for 20 hours.

A fired aggregation that was obtained through the calcining was put into a mortar and was crushed with a pestle, and sorting was performed with a sieve having a mesh of 53 μm, thereby collecting lithium metal composite oxide powder (sample) under the sieve.

From chemical analysis performed on the lithium metal composite oxide powder (sample) that was collected, it could be seen that a composition was $Li_{1.04}Ni_{0.52}Co_{0.19}Mn_{0.25}O_2$.

Comparative Example 2

A polycarboxylic acid ammonium salt aqueous solution (SN dispersant 5468, manufactured by San Nopco Ltd.) as a dispersant was added to ion-exchanged water. An amount of the dispersant that was added was set to 6% by weight on the basis of the total amount of a Ni raw material, a Mn raw material, a Co raw material, a Li raw material, and the like as described later, and the dispersant was sufficiently dissolved in and mixed with the ion-exchanged water.

Lithium carbonate, electrolytic manganese dioxide, cobalt oxyhydroxide, and nickel hydroxide are weighed in a molar ratio of Li:Mn:Ni:Co=1.05:0.25:0.51:0.19. Amounts of S in a Mn raw material, a Co raw material, and a Ni raw material, which were used, were 0.41%, 0.03%, and 0.21%, respectively. These raw materials were added the ion-exchanged water, in which the dispersant was dissolved in advance, and the resultant mixture was stirred, thereby preparing slurry having a solid content concentration of 50% by weight. The resultant mixture was pulverized with a wet pulverizer at 1300 rpm for 40 minutes, thereby setting D50 to 0.55 μm.

The resultant pulverized slurry that was obtained was granulated and dried by using a thermal spray dryer (spray dryer, OC-16, manufactured by Ohkawara Kakohki Co., Ltd.). At this time, a rotary disk was used for spraying, and granulation and drying were performed under conditions in which the number of revolutions was set to 24000 rpm, a slurry supply rate was set to 3 kg/hr, and a temperature was adjust so that an outlet temperature of a drying tower became 100° C.

The resultant granulated powder that was obtained was temporarily calcined by using a stationary electric furnace in the air at 450° C. Subsequently, the temporarily calcined powder was calcined by using a stationary electric furnace at 910° C. for 20 hours.

A fired aggregation that was obtained through the calcining was put into a mortar and was crushed with a pestle, and sorting was performed with a sieve having a mesh of 53 μm, thereby collecting lithium metal composite oxide powder (sample) under the sieve.

From chemical analysis performed on the lithium metal composite oxide powder (sample) that was collected, it could be seen that a composition was $Li_{1.05}Ni_{0.52}Co_{0.19}Mn_{0.24}O_2$.

Comparative Example 3

Sodium hydroxide and ammonia were fed to an aqueous solution in which nickel sulfate, cobalt sulfate, and manganese sulfate were dissolved, and a metal composite hydroxide, in which a molar ratio of nickel, cobalt, and manganese was 0.54:0.19:0.27, was prepared through a coprecipitation method.

The metal composite hydroxide, which was prepared in this manner, was constituted by spherical secondary particles in which a plurality of primary particles having a size of 1 μm or less were assembled, and D50 and a tap density of the obtained metal composite hydroxide were 11 μm and 2.2 g/cm$^3$, respectively.

Lithium hydroxide monohydrate was added to the metal composite hydroxide in such a manner that a molar ratio of Li/(Ni+CO+Mn) became 3.32, and the resultant mixture was dry-mixed by using a ball mill.

The obtained mixture of the metal composite hydroxide and the lithium hydroxide monohydrate was calcined in an oxygen atmosphere at 730° C. for 24 hours. It was tried to take out a calcined object that was obtained. However, it was difficult to take out the calcined object because reaction occurred with a ceramic container in which the mixture was put into.

<XRD Measurement>

With respect to each of the lithium metal composite oxide powders (samples) which were obtained in Examples and Comparative Examples, a 3a site occupancy by Li was measured in accordance with a Rietveld method using a fundamental method as described later.

The Rietveld method using the fundamental method is a method of refining structure parameters of a crystal from diffraction intensity obtained by powder X-ray diffraction and the like. The Rietveld method is a method in which a crystal structure model is assumed, and various parameters of the crystal structure are refined in such a manner that an X-ray diffraction pattern that is deduced from the structure through calculation and an X-ray diffraction pattern that is actually measured can match each other as possible.

During measurement of the X-ray diffraction pattern, an X-ray diffraction device (D8 ADVANCE, manufactured by Bruker AXS Analytical Instruments PVT Ltd.) using Cu-Kα rays was used. Analysis was performed on peaks of X-ray diffraction pattern obtained in a range of a diffraction angle 2θ of 10° to 120° by using analysis software (product name: "Topas Version 3"), thereby obtaining a 3a site occupancy rate by Li. On the other hand, on the assumption that the crystal structure belongs to a hexagonal of a space group R-3m, Li is present at the 3a site, a transition element such as Ni, Co, and Mn, a substitution element in a case of containing a substitution element (for example, Mg, Al, and Ti), and a surplus Li portion x are present at a 3b site, and a 6c site is occupied by O, a parameter Beq. was fixed to 1, a fraction coordinate of oxygen was set as a variable, and calculation was repeated until indexes Rwp<10.0 and GOF<2.5, which indicate coincidence between measured intensity and calculated intensity as illustrated in Table 1, converged to a reference. Incidentally, Gauss function was used for analysis.

=XRD Measurement Condition=

Ray source: CuKα, operation axis: 2θ/θ, measurement method: continuous, counting unit: cps Initiation angle: 10°, termination angle: 120°
  Detector: PSD
  Detector Type: VANTEC-1
  High Voltage: 5585V
  Discr. Lower Level: 0.25V
  Discr. Window Width: 0.15V
  Grid Lower Level: 0.075V
  Grid Window Width: 0.524V
  Flood Field Correction: Disabled
  Primary radius: 250 mm
  Secondary radius: 250 mm
  Receiving slit width: 0.1436626 mm
  Divergence angle: 0.3°
  Filament Length: 12 mm
  Sample Length: 25 mm
  Receiving Slit Length: 12 mm
  Primary Sollers: 2.623°
  Secondary Sollers: 2.623°
  Lorentzian, 1/Cos: 0.004933548Th An XRD pattern was obtained from each of the lithium metal composite oxide powders (samples) obtained in Examples and Comparative Examples, peaks derived from CuKα2-rays were removed on the basis of the XRD pattern, and a ratio (003)/(104) of integrated intensity of a (003) plane to integrated intensity of a (104) plane was obtained. In addition, crystallite sizes of a (003) plane and a (110) plane in the lithium metal composite oxide were obtained by using Sherrer's formula to calculate a ratio of the crystallite size of the (003) plane to the crystallite size of the (110) plane.

(Measurement of Primary Particle Area)

A primary particle area of each of the lithium metal composite oxide powders (samples) which were obtained in Examples and Comparative Examples was measured as follows. The sample (powder) was observed with a scanning electron microscope (SEM) at a magnification of 1000 times, and five secondary particles with a size corresponding to D50 were randomly selected for each viewing field. The magnification was changed to 5000 times, and 10 primary particles were randomly selected from each of the selected five secondary particles. In a case where the primary particles had a rod shape, the area was calculated by setting the longest inter-grain-boundary distance as a major axis (μm) and by setting the shortest inter-grain-boundary distance as a minor axis (μm). In a case where the primary particles had a spherical shape, the area was calculated by setting a length of an inter-grain-boundary distance as a diameter (μm). An average value of 50 areas was obtained as the primary particle area (μm$^2$).

On the other hand, the primary particle area, which was obtained in this manner, is shown as a "primary particle area" in Table and Graph.

<Measurement of D50>

With regard to the lithium metal composite oxide powders (samples) which were obtained in Examples and Comparative Examples, each of these samples (powders) was put into an aqueous solvent by using an automatic sample feeder for a laser diffraction particle size distribution measuring device ("Microtorac SDC", manufactured by NIKKISO CO., LTD.), and was irradiated with ultrasonic waves of 40 W in a flow rate of 40% for 360 seconds. A particle size distribution was measured by using a laser diffraction particle size distribution measuring device "MT3000II" manufactured by NIKKISO CO., LTD., and D50 was obtained from a chart of a volume-based particle size distribution that was obtained.

On the other hand, during measurement, the aqueous solvent was allowed to pass through a filter of 60 μm, a refractive index of the solvent was set to 1.33, a particle transmitting condition was set to "transmitting", a refractive index of particles was set to 2.46, a shape was set to a non-spherical shape, a measurement range was set to 0.133 μm to 704.0 μm, a measurement time was set to 30 seconds, and an average value of measurement values, which were measured twice, was set to D50.

<Measurement of Secondary Particle Area>

The lithium metal composite oxide powder (sample) was observed at a magnification of 1000 times by using a scanning electron microscope (SEM), five secondary particles with a size corresponding to D50 obtained through the above-described measurement were randomly selected, and the area was calculated by setting a length of an inter-grain-boundary distance as a diameter (μm) in a case where the secondary particles had a spherical shape, or through approximation to a spherical shape in a case where the secondary particles had an indefinite shape. Accordingly, an average value of the five areas was obtained as the secondary particle area (μm$^2$).

<Measurement of Amount of Carbon>

An amount of carbon in the lithium metal composite oxide powder (sample) was measured by combusting the sample in an oxygen air stream inside a combustion furnace by using a carbon and sulfur measuring device EMIA-520 manufactured by HORIBA, Ltd.

<Measurement of Amount of S>

An amount of S in each of the lithium metal composite oxide powders (samples), which were obtained in Examples and Comparative Example, was measured through inductively coupled plasma (ICP) emission spectrometry.

<Measurement of Amount of Na>

An amount of Na in each of the lithium metal composite oxide powders (samples), which were obtained in Examples and Comparative Examples, was measured through atomic absorption spectroscopy.

<Measurement of Surface Residual Alkali Value>

A surface residual alkali value in each of the lithium metal composite oxide powders (samples), which were obtained in Examples and Comparative Examples, was measured as follows.

10.0 g of each of the lithium metal composite oxide powders (samples), which were obtained in Examples and Comparative Examples, was dispersed in 50 mL of ion-exchanged water, the sample was filtered, and a supernatant liquid was titrated with hydrochloric acid. Phenolphthalein and bromophenol blue were used as an indicator at this time to determine the amount of lithium hydroxide and lithium carbonate, and then an amount of Li, which was calculated from these compounds, was set as the surface residual alkali value (%).

<Evaluation of Battery Characteristics>

8.0 g of each of the lithium metal composite oxide powders (samples), which were obtained in Examples and Comparative Examples, 1.0 g of acetylene black (manufactured by DENKI KAGAKU KOGYO KABUSHIKI KAISHA), and 8.3 g of solution obtained by dissolving 12% by weight of PVDF (manufactured by Kishida Chemical Co., Ltd.) in NMP (N-methyl pyrolidone) were accurately weighed, and were sufficiently mixed with each other after addition of 5 mL of NMP, thereby preparing paste. The paste was put on aluminum foil that is a current collector, and a coated film was formed by using an applicator in which a gap was set to 100 μm to 280 μm. The aluminum foil, on which the coated film was formed, was dried in vacuo at 140° C. for a day, and the resultant of aluminum foil was punched with a diameter of ϕ16 mm. The resultant punched aluminum foil was compressed under 4 t/cm$^2$, and was set as a positive electrode.

Immediately before preparation of a battery, the positive electrode was dried in vacuo at 200° C. for 300 minutes or longer to remove moisture, and then the positive electrode was assembled to the battery. In addition, an average value of the weight of the aluminum foil with a diameter of ϕ16 mm was obtained in advance, and the weight of a positive electrode mixture was obtained by subtracting the weight of the aluminum foil from the weight of the positive electrode. In addition, an amount of the positive electrode active material that was contained was obtained from a mixing ratio of the lithium metal composite oxide powder (positive electrode active material), the acetylene black, and the PVDF.

Metal Li having a diameter of ϕ19 mm and a thickness of 0.5 mm was set as a negative electrode. A material, which was obtained by dissolving 1 mol/L of LiPF$_6$ as a solute in a solvent obtained by mixing EC and DMC in a volume ratio of 3:7, was used as an electrolytic solution. According to this, a cell TOMCEL (registered trademark) illustrated in the drawing FIGURE for electrochemical evaluation was prepared.

(First Cycle Efficiency)

A first cycle efficiency was obtained in accordance with the following method by using the electrochemical cell that was prepared as described above. Specifically, from an amount of the positive electrode active material that was contained in the positive electrode, a capacity after constant-current and constant-potential charging up to 4.3 V at 25° C. with 0.1 C for 15 hours was set as a charge capacity (mAh/g), and a capacity after constant-current discharging up to 3.0 V with 0.1 C was set to a discharge capacity (mAh/g). In addition, a ratio of the discharge capacity to the charge capacity was set as a first cycle efficiency (%).

(Resistance Value of SOC 50%)

Constant-current charging was performed with 0.1 C to reach SOC 50% on the basis of the discharge capacity obtained as described above. A cell, which reached SOC 50%, was constant-current discharged with 1.0 C for 10 seconds by an electrochemical measuring device, and an initial resistance value was obtained from a potential difference before and after the discharging, and a current value.

Table 1 shows initial resistance values of Examples and Comparative Examples as a relative value on the assumption that an initial resistance value of Comparative Example 1 was 100.0%.

(High-Temperature Cycle Lifespan Evaluation: High-Temperature Cycle Characteristics at 60° C.)

A charging and discharging test was performed in accordance with the following method by using the electrochemical cell after evaluation of the initial charging and discharging efficiency, and high-temperature cycle charge-discharge cycle ability were evaluated described as above.

The electrochemical cell was put into an environment tester, in which a battery charging and discharging environmental temperature was set to 60° C., for preparation of charging and discharging, and was left as is for four hours in order for a cell temperature to reach an environmental temperature. Then, after one charging and discharging cycle was performed in a state in which a charging and discharging range was set to 3.0 V to 4.3 V, charging was performed with 0.1 C constant-current and constant-potential, and discharging was performed with 0.1 C constant-current, the charging and discharging cycle was performed 50 times with 1 C.

A percentage (%) of a numerical value, which was obtained by dividing a discharge capacity at a $51^{st}$ cycle by a discharge capacity at a second cycle, was obtained as a high-temperature cycle charge-discharge cycle ability value.

Table 1 shows high-temperature cycle charge-discharge cycle ability values of Examples and Comparative Examples as a relative value on the assumption that the high-temperature cycle charge-discharge cycle ability value of Comparative Example 1 was set to 100%.

<Evaluation of Thermal Stability>

10.0 g of each of the lithium metal composite oxide powders (samples) which were obtained in Example 3, and Examples 11 to 13, 0.29 g of acetylene black (DENKI KAGAKU KOGYO KABUSHIKI KAISHA), and 2.90 g of solution obtained by dissolving 12% by weight of PVDF (manufactured by KUREHA CORPORATION) in NMP (N-methyl pyrolidone) were accurately weighed, and were sufficiently kneaded after addition of 3.29 g of NMP by a planetary stirring and defoaming apparatus (MAZERUSTAR KK-505, manufactured by KURABO CONSTRUCTION SERVICE CO., LTD.), thereby obtaining paste. The paste was put on aluminum foil that is a current collector, and a coated film was formed by using an applicator in which a gap was adjusted to 250 μm. The aluminum foil, on which the coated film was formed, was dried in vacuo at 140° C. for a day, and the resultant of aluminum foil was roll-pressed under a linear pressure of 3 t. The roll-pressed aluminum foil was punched with a diameter of ϕ16 mm, and the resultant of punched aluminum foil was set as a positive electrode.

Immediately before preparation of a battery, the positive electrode was dried in vacuo at 200° C. for 300 minutes or longer to remove moisture, and then the positive electrode was assembled to the battery. In addition, an average value of the weight of the aluminum foil with a diameter of ϕ16 mm was obtained in advance, and the weight of a positive electrode mixture was obtained by subtracting the weight of the aluminum foil from the weight of the positive electrode. In addition, an amount of the positive electrode active material that was contained was obtained from a mixing ratio of the lithium metal composite oxide powder (positive electrode active material), the acetylene black, and the PVDF.

Metal Li having a diameter of ϕ19 mm and a thickness of 0.5 mm was set as a negative electrode. A material, which was obtained by dissolving 1 mol/L of LiPF$_6$ as a solute in a solvent obtained by mixing EC and DMC in a volume ratio of 3:7, was used as an electrolytic solution. According to this, a cell TOMCEL (registered trademark) illustrated in the drawing FIGURE for electrochemical evaluation was prepared.

The following charging state was set by using the electrochemical cell that was prepared as described above.

A C-rate was calculated by using an amount of a positive electrode active material that was contained in the positive electrode. Constant-current and constant-potential charging (charging was completed with a current value of 0.001 C) was performed at 25° C. up to 4.3 V with 0.1 C, and then constant-current discharging was performed up to 3.0 V with 0.1 C. The charging and discharging as described above were performed two cycles, and then at a third cycle, constant-current and constant-potential charging (charging was terminated with a current value of 0.001 C) was performed at 25° C. up to 4.3 V with 0.1 C.

The electrochemical evaluation cell, which entered a charged state, was disassembled in a glove box. The positive electrode was taken out, and was punched to obtain 6 sheets of 4ϕ. The punched 6 sheets of 4ϕ were put into a high-pressure container, and 10 μl, of the above-described electrolytic solution was added dropwise. The high-pressure container was hermetically closed, and was left as is for a night in order for the positive electrode to be impregnated with the electrolytic solution.

The high-pressure container, into which the positive electrode was put, was set to a DSC measuring device (DSC3300S, manufactured by MAC Science Corporation), and a flow of an Ar gas was set to 100 ml/min so as to attain an Ar atmosphere. Under the Ar flow, a temperature was raised to 350° C. at a rate of 5° C./min, and a quantity of heat was measured. At this time, a temperature, at which the maximum quantity of heat was generated, was set as an exothermic peak temperature (° C.).

<Measurement of Amount of Magnetic Substance>

An amount of the magnetic substance was measured as follows. 500 cc of ion-exchanged water and a piece of a cylindrical stirrer type magnet (magnet of which a magnetic force measured by using TESLA METER type TM-601 manufactured by KANETEC CO., LTD. was 132 mT) coated with tetrafluoroethylene were added to 100 g of each of the lithium metal composite oxide powders (samples) which was obtained in Example 9 and Comparative Example 1 and was put into a 500 cc resin container with a lid, and then the resin container was placed on a ball mill rotary stand and was rotated to obtain slurry. Next, the magnet was taken out from the resin container, and was immersed in ion-exchanged water to remove a surplus powder that was attached to the magnet with an ultrasonic cleaning machine. Next, the magnet was taken out from the ion-exchanged water, and was immersed in aqua regia. In the aqua regia, the magnet was warmed up at 80° C. for 30 minutes to dissolve the magnetic substance, and the aqua regia, in which the magnetic substance was dissolved, was analyzed with an ICP emission analyzer to determine amounts of iron, chromium, and zinc, respectively. The total amount of these elements was set as an amount of the magnetic substance, and an amount of magnetic substance per weight of the amount of the material for the positive electrode active material was calculated.

TABLE 1

|  |  | Example 1 | Example 2 | Example 3 | Example 4 | Example 5 | Example 6 | Example 7 | Example 8 |
|---|---|---|---|---|---|---|---|---|---|
| Integrated intensity ratio (003)/(104) | — | 1.24 | 1.29 | 1.26 | 1.31 | 1.23 | 1.26 | 1.29 | 1.23 |
| 3a site occupancy rate by Li |  | 0.98 | 0.98 | 0.98 | 0.99 | 0.97 | 0.98 | 0.98 | 0.98 |
| Crystallite size(003)/(104)ratio | — | 1.8 | 2 | 2.4 | 2.1 | 1.6 | 2.1 | 2.4 | 2.3 |
| Primary particle area | μm$^2$ | 0.2 | 0.3 | 0.6 | 0.6 | 0.5 | 0.6 | 0.6 | 0.6 |
| D50 (μm) | μm | 6 | 6 | 7 | 7 | 10 | 7 | 7 | 7 |
| Primary particle area/secondary particle area | — | 0.005 | 0.009 | 0.015 | 0.016 | 0.006 | 0.017 | 0.018 | 0.016 |
| Specific surface area | m$^2$/g | 1.4 | 1 | 0.8 | 1 | 1.1 | 0.9 | 1 | 0.9 |
| Amount of carbon/specific surface area | ppm/(m$^2$/g) | 801 | 670 | 715 | 605 | 626 | 620 | 610 | 630 |
| S | % | 0.03 | 0.03 | 0.03 | 0.03 | 0.03 | 0.03 | 0.03 | 0.03 |
| Na | ppm | 160 | 140 | 150 | 130 | 120 | 130 | 130 | 130 |
| Surface residual alkali value/specific surface area | %/(m$^2$/g) | 0.13 | 0.11 | 0.12 | 0.1 | 0.11 | 0.1 | 0.1 | 0.1 |
| Charge capacity | mAh/g | 191 | 191 | 191 | 191 | 196 | 192 | 192 | 192 |
| First cycle efficiency | % | 89.0 | 89.0 | 88.9 | 88.9 | 88.8 | 88.9 | 88.9 | 88.9 |
| Resistance value of SOC 50% (25° C., 1 C) | % | 90.6 | 89.9 | 90.4 | 89.6 | 90.3 | 91.6 | 89.3 | 89.5 |
| 60° C., 50 cycles | % | 179 | 172 | 162 | 162 | 170 | 162 | 161 | 160 |
| Exothermic peak temperature | ° C. | — | — | 234 | — | — | — | — | — |
| Amount of magnetic substance | ppb | — | — | 98 | — | — | — | — | — |

|  |  | Example 9 | Example 10 | Example 11 | Example 12 | Example 13 | Comparative Example 1 | Comparative Example 2 |
|---|---|---|---|---|---|---|---|---|
| Integrated intensity ratio (003)/(104) | — | 1.31 | 1.3 | 1.26 | 1.26 | 1.26 | 1.23 | 1.23 |
| 3a site occupancy rate by Li |  | 0.98 | 0.98 | 0.98 | 0.96 | 0.98 | 0.97 | 0.97 |
| Crystallite size(003)/(104)ratio | — | 2.2 | 2.1 | 2.4 | 2.4 | 2.4 | 2.6 | 2.6 |
| Primary particle area | μm$^2$ | 0.7 | 0.7 | 0.6 | 0.6 | 0.6 | 0.8 | 0.8 |
| D50 (μm) | μm | 7 | 7 | 7 | 7 | 7 | 17 | 17 |
| Primary particle area/secondary particle area | — | 0.018 | 0.018 | 0.016 | 0.016 | 0.016 | 0.003 | 0.003 |
| Specific surface area | m$^2$/g | 0.9 | 0.9 | 0.8 | 0.8 | 0.8 | 0.2 | 0.2 |
| Amount of carbon/specific surface area | ppm/(m$^2$/g) | 815 | 933 | 537 | 534 | 552 | 3091 | 3853 |
| S | % | 0.06 | 0.09 | 0.03 | 0.03 | 0.03 | 0.12 | 0.26 |
| Na | ppm | 190 | 290 | 130 | 130 | 130 | 340 | 350 |
| Surface residual alkali value/specific surface area | %/(m$^2$/g) | 0.16 | 0.19 | 0.1 | 0.11 | 0.1 | 0.55 | 0.68 |
| Charge capacity | mAh/g | 190 | 191 | 191 | 192 | 191 | 190 | 189 |
| First cycle efficiency | % | 88.7 | 88.7 | 88.7 | 88.7 | 88.7 | 88.5 | 88.0 |
| Resistance value of SOC 50% (25° C., 1 C) | % | 92.5 | 94.5 | 87.1 | 85.9 | 83.5 | 100.0 | 107 |

TABLE 1-continued

| | | | | | | | | |
|---|---|---|---|---|---|---|---|---|
| 60° C., 50 cycles | % | 162 | 168 | 165 | 164 | 165 | 100 | 95 |
| Exothermic peak temperature | ° C. | — | — | 293 | 297 | 291 | — | — |
| Amount of magnetic substance | ppb | 56 | — | — | — | — | 224 | — |

(Consideration)

From results in Table 1, and the like, it could be seen that in the present lithium metal composite oxide, when the primary particle area/the secondary particle area is equal to or less than 0.035, it is possible to raise the first cycle efficiency. The reason for the effect is considered as follows. when the primary particle area/the secondary particle area is equal to or less than 0.035, the area of the secondary particle surface which comes into contact with the electrolytic solution increases, and thus intercalation and deintercalation of lithium ions can be smoothly performed, and the first cycle efficiency can be raised. On the other hand, it could be seen that when the primary particle area/the secondary particle area is equal to or greater than 0.004, it is possible to raise the first cycle efficiency. The reason for the effect is considered as follows. When the primary particle area/the secondary particle area is equal to or greater than 0.004, an interface between the primary particles in the secondary particles decreases. As a result, it is possible to lower a resistance inside the secondary particles, and thus it is possible to raise the first cycle efficiency.

In addition, it could be seen that when the ratio of the crystallite size of the (003) plane to the crystallite size of the (110) plane is set to equal to or greater than 1.0 and less than 2.5, the cycle characteristics are improved.

In addition, from the results in Table 1, and the like, it could be seen that when the temporary calcining is performed at a temperature equal to or higher than 650° C. and lower than 730° C., the washing is performed with water, and then the main calcining is performed at 830° C. to 950° C., it is possible to suppress the formation of a rock-salt structure layer, and when the amount of S, the amount of Na, and the surface residual alkali value/the specific surface area are made to be small, it is possible to effectively reduce the initial resistance.

In addition, it could be seen that prior to the wet pulverization, when the raw materials other than the Li compound are subjected to the treatment including any one kind of calcining, washing, and magnetic separation, or a combination of two or more kinds thereof so as to set the amount of S in the Ni raw material to less than 0.17%, the amount of S in the Mn raw material to less than 0.24%, and the amount of S in the Co raw material to less than 0.12%, and so as to adjust an amount of magnetic substance in all of the raw materials other than the Li compound to less than 750 ppb, it could be seen that formation of the rock-salt structure layer is suppressed, it is possible to reduce the amount of S, and it is possible to effectively reduce the initial resistance.

In the DSC measurement, a quantity of heat generated due to combustion of the electrolytic solution was observed. As a temperature is raised, oxygen is emitted from the positive electrode material, and thus the electrolytic solution is violently combusted, and an exothermic peak is observed. In Examples 11 to 13, a surface treatment was performed, and thus the exothermic peak temperature was shifted toward a higher temperature side in relation to Example 3. The reason for the shift is considered as follows. When the surface treatment is performed, a surface layer, which contains at least either titanium (Ti) or aluminum (Al), or both of these, is formed on the entirety or a part of a surface of lithium metal composite oxide particles, and thus reaction with the electrolytic solution can be suppressed. On the other hand, the presence of the surface layer was also confirmed with an X-ray photoelectron spectroscopic analyzer (XPS).

The invention claimed is:

1. A lithium metal composite oxide powder that contains a lithium metal composite oxide having a layered structure,
    wherein an amount of S, which is obtained through measurement by an ICP emission analyzer, is less than 0.10% by mass of the lithium metal composite oxide powder (100% by mass),
    a ratio of a crystallite size of a (003) plane to a crystallite size of a (110) plane in the lithium metal composite oxide, which are calculated from Sherrer's formula by using an X-ray diffraction pattern obtained through X-ray diffraction with CuKα-rays, is equal to or greater than 1.0 and less than 2.5,
    a ratio (referred to as "primary particle area/secondary particle area") of a primary particle area that is obtained by the following method of measuring the primary particle area to a secondary particle area that is obtained by the following method of measuring the secondary particle area from secondary particles with a size corresponding to D50 in accordance with a volume-based particle size distribution obtained through measurement by a laser diffraction and scattering particle size distribution measurement method (hereinafter, referred to as "D50") is 0.004 to 0.035,
    wherein in the method of measuring the secondary particle area, the lithium metal composite oxide powder is observed with an electron microscope, five secondary particles with a size corresponding to D50 are randomly selected, and the area is calculated by setting a particle length as a diameter (μm) in a case where the secondary particles have a spherical shape, or through approximation to a spherical shape in a case where the secondary particles have an indefinite shape, and an average value of five areas is obtained as the secondary particle area (μm$^2$), and
    wherein the method of measuring the primary particle area, the lithium metal composite oxide powder is observed with the electron microscope, five secondary particles per one viewing field are randomly selected, 10 primary particles are randomly selected from each of the five secondary particles which are selected, the area is calculated by setting the longest inter-grain-boundary distance as a major axis (μm) and by setting the shortest inter-grain-boundary distance as a minor axis (μm) in a case where the primary particles have a rod shape, or by setting a length of an inter-grain-boundary distance as a diameter (μm) in a case where the primary particles have a spherical shape, and an average value of 50 areas is obtained as the primary particle area (μm$^2$).

2. The lithium metal composite oxide powder according to claim 1, wherein in the X-ray diffraction pattern obtained through the X-ray diffraction with the CuKα-rays, a ratio of integrated intensity of a (003) plane to integrated intensity of (104) plane in the lithium metal composite oxide is greater than 1.15.

3. The lithium metal composite oxide powder according to claim 1, wherein D50 in accordance with the volume-based particle size distribution obtained through the measurement by the laser diffraction and scattering particle size distribution measurement method (hereinafter, referred to as "D50") is greater than 4 μm and less than 20 μm.

4. The lithium metal composite oxide powder according to claim 1, wherein a specific surface area, which is obtained by a BET method, is greater than 0.3 m$^2$/g and less than 3.0 m$^2$/g.

5. The lithium metal composite oxide powder according to claim 1,
wherein the primary particle area obtained by the following method of measuring the primary particle area is 0.002 μm$^2$ to 13.0 μm$^2$, and
wherein in the method of measuring the primary particle area, the lithium metal composite oxide powder is observed with the electron microscope, five secondary particles per one viewing field are randomly selected, 10 primary particles are randomly selected from each of the five secondary particles which are selected, the area is calculated by setting the longest inter-grain-boundary distance as a major axis (μm) and by setting the shortest inter-grain-boundary distance as a minor axis (μm) in a case where the primary particles have a rod shape, or by setting a length of an inter-grain-boundary distance as a diameter (μm) in a case where the primary particles have a spherical shape, and an average value of 50 areas is obtained as the primary particle area (μm$^2$).

6. The lithium metal composite oxide powder according to claim 1, wherein a surface residual alkali value per specific surface area (surface residual alkali value/specific surface area) is less than 0.55(%/(m$^2$/g)).

7. The lithium metal composite oxide powder according to claim 1, wherein an amount of carbon per specific surface area (amount of carbon/specific surface area) is 3000 (ppm/(m$^2$/g)) or less.

8. The lithium metal composite oxide powder according to claim 1, wherein an amount of magnetic substance is less than 200 ppb.

9. The lithium metal composite oxide powder according to claim 1, wherein a 3a site occupancy rate by Li in the lithium metal composite oxide, which is obtained through Rietveld analysis by using an X-ray diffraction pattern obtained through X-ray diffraction with CuKα-rays, is equal to or greater than 0.97.

10. The lithium metal composite oxide powder according to claim 1, comprising:
a surface layer, which contains one kind or two or more kinds selected from the group consisting of titanium (Ti), aluminum (Al), and zirconium (Zr), on the entirety or a part of a surface of lithium metal composite oxide particles.

11. The lithium metal composite oxide powder according to claim 10, wherein a thickness of the surface layer is 0.01 nm to 200 nm.

12. The lithium metal composite oxide powder according to claim 1, wherein the lithium metal composite oxide powder is produced by using a lithium metal composite oxide raw material that is obtained through a treatment including any one kind of calcining, washing, and magnetic separation, or a combination of two or more of the calcining, the washing, and the magnetic separation with respect to the lithium metal composite oxide raw material.

13. The lithium metal composite oxide powder according to claim 1, wherein the lithium metal composite oxide powder is produced by using trimanganese tetraoxide, in which an amount of S is less than 0.24% and an amount of magnetic substance is less than 750 ppb, as a lithium metal composite oxide raw material that is obtained through a treatment including any one kind of calcining, washing, and magnetic separation, or a combination of two or more of the calcining, the washing, and the magnetic separation with respect to the lithium metal composite oxide raw material.

14. A lithium secondary battery, comprising:
the lithium metal composite oxide powder according to claim 1 as a positive electrode active material.

15. A lithium secondary battery for a hybrid electric vehicle or an electric vehicle, comprising:
the lithium metal composite oxide powder according to claim 1 as a positive electrode active material.

\* \* \* \* \*